United States Patent
Yamazaki et al.

(10) Patent No.: US 8,219,039 B2
(45) Date of Patent: *Jul. 10, 2012

(54) RADIO COMMUNICATION DEVICE AND RADIO COMMUNICATION METHOD

(75) Inventors: Chiharu Yamazaki, Yokohama (JP); Shigeru Kimura, Yokohama (JP); Takeshi Toda, Yokohama (JP); Kenta Okino, Yokohama (JP)

(73) Assignee: Kyocera Corporation, Kyoto (JP)

( * ) Notice: Subject to any disclaimer, the term of this patent is extended or adjusted under 35 U.S.C. 154(b) by 315 days.

This patent is subject to a terminal disclaimer.

(21) Appl. No.: 12/442,085

(22) PCT Filed: Sep. 20, 2007

(86) PCT No.: PCT/JP2007/068310
§ 371 (c)(1),
(2), (4) Date: Feb. 18, 2010

(87) PCT Pub. No.: WO2008/035746
PCT Pub. Date: Mar. 27, 2008

(65) Prior Publication Data
US 2010/0173592 A1      Jul. 8, 2010

(30) Foreign Application Priority Data

Sep. 21, 2006  (JP) .................................. 2006-256541
Sep. 28, 2006  (JP) .................................. 2006-265805

(51) Int. Cl.
*H04B 1/00* (2006.01)
*H04B 7/00* (2006.01)
(52) U.S. Cl. .............................. 455/69; 455/73; 455/561
(58) Field of Classification Search .................... 455/69, 455/73, 561, 562.1
See application file for complete search history.

(56) References Cited

U.S. PATENT DOCUMENTS 7,565,171 B2 *   7/2009  Doi et al. .................... 455/562.1
2004/0166903 A1 *  8/2004  Nakanishi .................. 455/562.1
(Continued)

FOREIGN PATENT DOCUMENTS

JP            2003032167 A      1/2003
(Continued)

OTHER PUBLICATIONS

Japanese language office action dated Mar. 22, 2011 and its English language translation for corresponding Japanese application 2006256541.

(Continued)

*Primary Examiner* — Tuan H Nguyen
(74) *Attorney, Agent, or Firm* — DLA Piper LLP (US)

(57) ABSTRACT

A radio communication device according to the present invention adaptively controls directivity of a transmission radio signal by using a plurality of element antennas on the basis of a received radio signal received from a communication target counterpart radio communication device. The radio communication device includes a transmission controller configured to process the transmission radio signal according to a first control method for adaptively controlling the directivity, a propagation path state detector configured to detect fluctuation state of a propagation path to a counterpart radio communication device, and a judgment unit configured to judge whether or not to change the directivity on the basis of the fluctuation state of the propagation path. If it is judged that the directivity is to be changed, the transmission controller switches to a second control method that is different from the first control method, and processes the transmission radio signal according to the second control method.

32 Claims, 21 Drawing Sheets

U.S. PATENT DOCUMENTS

2004/0176136 A1 9/2004 Doi et al.

FOREIGN PATENT DOCUMENTS

| | | |
|---|---|---|
| JP | 2003198508 A | 7/2003 |
| JP | 2003332954 A | 11/2003 |
| JP | 2004159077 A | 6/2004 |
| KR | 20040074935 A | 8/2004 |

OTHER PUBLICATIONS

International search report for corresponding PCT application PCT/JP2007/068310.

Korean language office action dated Oct. 29, 2010 and its English language translation for corresponding Korean application 1020097006812.

* cited by examiner

FIG. 12

| RECEIVER | RECEIVER 101_1 | RECEIVER 101_2 | RECEIVER 101_3 |
|---|---|---|---|
| DESIRED WAVE RECEIVED POWER | 0.3 | 0.5 | 0.9 |
| REVERSED ABSOLUTE VALUE OF WEIGHT | 0.7 | 0.5 | 0.1 |
| VALUE AFTER MULTIPLYING ABSOLUTE VALUE OF WEIGHT BY DESIRED WAVE POWER | 0.21 | 0.25 | 0.09 |
| MULTIPLICATION VALUE TO HAVE MINIMUM SUM | −0.21 | 0.25 | −0.09 |
| CORRECTION CODE m (i) | −1 | 1 | −1 |
| CORRECTION TERM Φ (i) | $\pi$ | 0 | $\pi$ |

RADIO COMMUNICATION DEVICE AND RADIO COMMUNICATION METHOD

TECHNICAL FIELD

The present invention relates to a radio communication device and a radio communication method in which directivity of radio signals to be transmitted to a communication target radio of communication device is adaptively controlled by use of a plurality of element antennas on the basis of radio signals received from the communication target radio communication device.

BACKGROUND ART

Conventionally, in a radio communication system such as a mobile communication system, there has been widely used adaptive array control that adaptively controls directivity of radio signals by using a plurality of element antennas, the radio signals being to be transmitted from a radio base station to a communication target radio communication device, for example, a radio communication terminal. With the adaptive array control, directivity of radio signals can be controlled depending on a position of the radio communication terminal.

However, a radio communication system using the adaptive array control has a problem that directivity of radio signals to be transmitted according to a position of a radio communication terminal cannot be controlled appropriately if the radio communication terminal moves during ongoing communications.

Hence, there is proposed a method of estimating Doppler variations (Doppler frequencies) on the basis of radio signals received from the radio communication terminal, and controlling the directivity of the radio signals by using a predetermined number of element antennas by using a predetermined number of element antennas whose estimated Doppler variations are small (for example, Patent Document 1).

With such a method, element antennas with small Doppler variations are selected from among all the element antennas, and therefore, it is believed that excellent directivity of the radio signals can be ensured even when the radio communication terminal moves during ongoing communications.

Patent Document 1: Japanese Patent Application Publication No. 2003-198508 (Page 8, FIG. 5)

DISCLOSURE OF THE INVENTION

Meanwhile, around the radio communication terminal, periodic signals periodically having peaks of electric power values like a standing wave appear due to radio signals transmitted from the radio base station. In general, a wavelength of such a periodic signal, if it is shortest, is almost half of a wavelength of a radio signal transmitted from the radio base station. When the frequency of the radio signal is in a 2 GHz-band, for example, and if it is assumed that the wavelength of the periodic signal is almost half, the wavelength of the periodic signal is approximately 7.5 cm.

That is, when a radio communication terminal or an object (e.g., a vehicle) existing around the radio communication terminal moves at high speed (100 km/h or higher), there are some cases in which the state of propagation path between the radio base station and the radio communication terminal has drastically changed at the time when the radio communication terminal receives a radio signal regulated by the radio base station through the adaptive array control. Thus, there is a problem of degrading the communication quality of radio signals received by the radio communication terminal.

Specifically, when the radio communication terminal or the object existing around the radio communication terminal moves at high speed, the radio communication terminal moves to a position where an electric power value of a periodic signal is off peak and thus the communication quality of the radio signal received by the radio communication terminal is significantly degraded.

Hence, the present invention has been made in light of such circumstances, and it is an objective of the present invention to provide a radio communication device and a radio communication method capable of suppressing degradation of the communication quality even in the case where the state of the propagation path to a radio communication device rapidly fluctuates due to high-speed movement of the communication target radio communication device or an object existing around the communication target radio communication device.

In order to solve the aforementioned problem, the present invention includes the following features. First, a first aspect of the present invention is summarized as a radio communication device (for example, radio base station 100) which adaptively controls directivity of a transmission radio signal (downlink signal RSdown) by use of a plurality of element antennas on the basis of a received radio signal (uplink signal RSup) received from a counterpart radio communication device (for example, radio communication terminal 200) that is a communication target radio communication device, the transmission radio signal being to be transmitted to the counterpart radio communication device, the radio communication device comprising: a transmission controller (adaptive processing controller 107) configured to process the transmission radio signal according, to a first control method for adaptively controlling the directivity of the transmission radio signal; a propagation path state detector (propagation path state detector 105) configured to detect a fluctuation state of a propagation path to the counterpart radio communication device on the basis of the received radio signal; and a judgment unit (judgment unit 106) configured to judge whether or not to change the directivity of the transmission radio signal on the basis of the fluctuation state of the propagation path detected by the propagation path state detector, wherein when the judgment unit judges to change the directivity of the transmission radio signal, the transmission controller switch to a second control method that is different from the first control method, and then processes the transmission radio signal according to the second control method.

According to the aspect, if it is judged to change the directivity of the transmission radio signal on the basis of the so fluctuation state of the propagation path, the radio communication device changes the control method according to one from among a plurality of control methods with different directionalities. Accordingly, since the radio communication device adaptively controls the directivity by changing the control method depending on the fluctuation state of the propagation path, the control method can be changed to an appropriate control method even when the propagation path to the counterpart radio communication device fluctuates. In other words, according to the aspect, the radio communication device can suppress degradation of the communication quality, even in the case where the state of the propagation path to the counterpart radio communication device rapidly fluctuates because the counterpart radio communication device at the communication target or the object existing around the counterpart radio communication device at the communication target moves at high speed (100 km/h or higher).

A second aspect of the present invention is summarized as the radio communication device according to the first aspect of the present invention, wherein the propagation path state detector identifies a cycle of fluctuation in which the fluctuation state of the propagation path to the counterpart radio communication device fluctuates, on the basis of the detected fluctuation state of the propagation path, and the judgment unit judges whether or not to change the directivity of the transmission radio signal, on the basis of the cycle of fluctuation.

According to the aspect; since the radio communication device detects the fluctuation state more accurately and controls the state of the transmission radio signal by the cycle of fluctuation, the radio communication device can control the state of the transmission radio signal appropriately even when the propagation path to the counterpart radio communication device fluctuates. Thus, according to the aspect, the radio communication device can suppress degradation of the communication quality, even in the case where the state of the propagation path to the counterpart radio communication device rapidly fluctuates because the counterpart radio communication device at the communication target or the object existing around the counterpart radio communication device at the communication target moves at high speed (100 km/h or higher).

A third aspect of the present invention is summarized as the radio communication device according to the second aspect of the present invention, wherein when judging whether or not to change is the directivity, the judgment unit makes a comparison between the cycle of fluctuation identified by the propagation path detector and processing time from the time of receiving the received radio signal from the counterpart radio communication device to the time of transmitting the transmission radio signal, and the transmission controller transmits the transmission radio signal with a null directed to a position where the counterpart radio communication device is located at the time of receiving the received radio signal, on the basis of a result of the comparison between the processing time and the cycle of fluctuation by the judgment unit.

According to the aspect, since the radio communication device makes a comparison between the cycle of fluctuation of the state of the propagation path and the processing time from the time of receiving the received radio signal to the time of transmitting the transmission radio signal and then transmits the transmission radio signal so that the null is directed to the position at the reception time of the received radio signal, the radio communication device can reduce transmissions of the transmission radio signal with the null directed to the counterpart radio communication device at the transmission time of the transmission radio signal. Thus, the radio communication device can suppress degradation of the quality of communications with the counterpart radio communication device.

A fourth aspect of the present invention is summarized as the radio communication device according to the third aspect of the present invention, wherein when judging whether or not to change the directivity, the judgment unit judges whether or not the processing time is almost half of the cycle of fluctuation, and when the judgment unit judges that the processing time is almost half of the cycle of fluctuation, the transmission controller transmits the transmission radio signal with the null directed to position where the counterpart radio communication device is located at the time of receiving the received radio signal, according to the second control method.

According to the aspect, the radio communication device transmits the transmission radio signal with the null directed to the position where the counterpart radio communication device is located at the reception time of the received radio signal, if the processing time is almost half of the cycle of fluctuation of the state of the propagation path. That is, the radio communication device transmits more transmission radio signal with a peak (beam) directed to the counterpart radio communication device at the transmission time of the transmission radio signal, thereby being able to reduce transmissions of the transmission radio signal with the null directed. Accordingly, the radio communication device can suppress degradation of the quality of communications with the counterpart radio communication device.

A fifth aspect of the present invention is summarized as the radio communication device according to the second aspect of the present invention, wherein the propagation path state detector detects the fluctuation state by detecting Doppler variation of each of the received radio signal.

According to the aspect, the radio communication device can detect the cycle of fluctuation more accurately from a cycle of Doppler variation.

A sixth aspect of the present invention is summarized as the radio communication device according to the second aspect of the present invention, wherein the propagation path state detector detects the fluctuation state by detecting fluctuation in an electric power value of each of the received radio signal.

According to the aspect, the radio communication device can detect the cycle of fluctuation of the state of the propagation path more accurately from the cycle of fluctuation in the electric power value of the received radio signal.

A seventh aspect of the present invention is summarized as the radio communication device according to the second aspect of the present invention, further comprising: an antenna correlation detector configured to detect degrees of correlation between the received radio signal respectively received by the plurality of element antennas, wherein the transmission controller transmits the transmission radio signal with a null directed to a position where the counterpart radio communication device is located at the time of receiving the received radio signal, according to the second control method, on the basis of the degrees of correlation detected by the antenna correlation detector.

According to the aspect, the radio communication device can transmit transmission radio signal in consideration of the state of the propagation path depending on whether the degree of correlation is high or low, on the basis of the degrees of correlation of the received radio signal in the respective element antennas.

An eighth aspect of the present invention is summarized as the radio communication device according to the third aspect of the present invention, further comprising: a phase difference calculator configured to received a known signal transmitted from the counterpart radio communication device and having known values of amplitude and phase, and to calculate a phase difference between the received known signal and a known signal that has been stored in advance in the radio communication device, wherein using the phase difference calculated by the phase difference calculator, the transmission controller assigns the transmission radio signal a transmission weight causing a null to be directed to a position where the counterpart radio communication device is located at the time of receiving the received radio signal, according to the second control method.

According to the aspect, using the phase difference between the known signal and the received radio signal, the radio communication device applies the transmission weight to the transmission radio signal. With the transmission weight, the null is directed to the position where the counterpart radio communication device is located at the reception time of the received radio signal. That is, the radio communication device can transmit a transmission radio signal with a higher peak (beam) of received power, to the counterpart radio communication device at the transmission time of the transmission radio signal.

A ninth aspect of the present invention is summarized as the radio communication device according to the eighth aspect of the present invention, wherein the phase difference calculator calculates a phase difference between the known signal stored in the radio communication device and each of the received radio signal respectively received by the plurality of element antennas, and in the second control method, on the basis of a plurality of the phase differences calculated by the phase difference calculator and the electric power values of the received radio signal respectively received by the plurality of element antennas, the transmission controller assigns the transmission radio signal the transmission weight with which the electric power values of the transmission radio signal to be transmitted via the plurality of element antennas become small at the position where the counterpart radio communication device is located at the time of receiving the received radio signal.

According to the aspect, the radio communication device applies the transmission weight to the transmission radio signal. With the transmission weight, received power decreases at the position where the counterpart radio communication device is located at the reception time of the received radio signal, on the basis of the phase difference and the electric power value. That is, the radio communication device transmits the transmission radio signal with a higher peak (beam) of the received power to the counterpart radio communication device at the transmission time of the transmission radio signal, and can thereby reduce transmissions of the transmission radio signal with the null directed.

An eleventh aspect of the present invention is summarized as the radio communication device according to the tenth aspect of the present invention, wherein the antenna selector selects any is one of the element antennas having the lowest electric power value of the received radio signal.

According to the aspect, since the radio communication device transmits the transmission radio signal via the element antenna with, the lowest electric power value, the radio communication device can reduce transmissions of the transmission radio signal with the null directed, to the counterpart radio communication device at the transmission time of the transmission radio signal, by transmitting the transmission radio signal via an element antenna having the highest electric power value.

A twelfth aspect of the present invention is summarized as the radio communication device according to the third aspect of the present invention, further comprising: a correction term calculator (correction term calculator 141) configured to calculate a correction term to be used in a computation formula for computing a correction and a transmission weight of the transmission radio signal, on the basis of the fluctuation state of the propagation path detected by the propagation path state detector, wherein the transmission controller assigns the transmission weight to the transmission radio signal by use of the correction term calculated by the correction term calculator, according to the second control method.

According to the aspect, since the radio communication device calculates the correction term for correcting the transmission weight of the transmission radio signal, on the basis of the fluctuation state of the propagation path, and applies the transmission weight that has been corrected by using the correction term, to the transmission radio signal, the radio communication device can reduce transmissions of the transmission radio signal with the null directed, to the counterpart radio communication device at the transmission time of the transmission radio signal.

A thirteenth aspect of the present invention is summarized as the radio communication device according to the second aspect of the present invention, wherein the received radio signal use a plurality of frequency bands, the radio communication device further comprising a frequency band correlation detector (propagation path fluctuation correlation value calculator 154) configured to detect degrees of correlation between the plurality of frequency bands, wherein the transmission controller transmits the transmission radio signal in come of the frequency bands whose degree of correlation detected by the frequency band correlation detector is equal to or higher than a predetermined threshold, according to the second control method using a common weight causing a null to be directed to the position where the counterpart radio communication device is located at the time of receiving the received radio signal.

According to the aspect, the radio communication device load the same weight and transmits the transmission radio signal, in the plurality of frequency bands having the degrees of correlation equal to or higher than the predetermined threshold value.

Consequently, the radio communication device can reduce load of computation processing in calculating a weight, because the radio communication device does not have to calculate a weight for each of the plurality of frequency bands and can transmit the is transmission radio signal by using a weight calculated for one frequency band.

A fourteenth aspect of the present invention is summarized as a radio communication method used in a radio communication device configured to adaptively controls directivity of a transmission radio signal by use of a plurality of element antennas on the basis of a received radio signal received from a counterpart radio communication device that is a communication target radio communication device, the transmission radio signal being to be transmission to the counterpart radio communication device, the radio communication method comprising: a control step of processing the transmission radio signal according to any of a first control method for adaptively controlling directivity of the transmission radio signal; a detection step of detesting a fluctuation state so of a propagation path to the counterpart radio communication device on the basis of the received radio signal; and a judgment step of judging whether or not to change the directivity of the transmission radio signal on the basis of the detected fluctuation state of the propagation path, wherein in the control step, the radio communication device switches to a second control method that is different from the first control method and then processes the transmission radio signal according to the second control method so that a null is directed to a position of the counterpart radio communication device at the reception time of the received radio signal, when it is judged that the directivity of the transmission radio signal is to be changed.

A fifteenth aspect of the present invention is summarized as the radio communication method according to the fourteenth aspect of the present invention, wherein in the control step, the radio communication device processes the transmission radio signal according to the first control method so that the beam is directed to the position of the counterpart radio communication device at the reception time of the received radio signal, when it is judged that the directivity of the transmission radio signal is to be changed in the judgment stop.

In other words, according to the aspect of the present invention, it is possible to provide a radio communication device and a radio communication method capable of supporting degradation of the communication quality, even in the case where the state of the propagation path to the radio communication device rapidly fluctuates because the communication target radio communication device or the object existing around the communication target radio communication device moves at high speed.

A sixteenth aspect of the present invention to summarized as a radio communication device (radio base station 1100) which adaptively controls directivity of a transmission radio signal by use of a plurality of element antennas, the radio communication device comprising: a first propagation path state detector (propagation path state detector 1103) configured to detector a first fluctuation state that is a fluctuation state of a propagation path to a first counterpart radio communication device (for example, radio communication terminal 1201), on the basis of a first received radio signal (uplink signal RSup1) received from the first counterpart radio communication device; a second propagation path state detector (propagation path state detector 1103) configured to detect a second fluctuation state that is a fluctuation state of the propagation path to a second counterpart radio communication device (radio communication terminal 1202), on the basis of a second received radio signal received from the second counterpart radio communication device, a judgment unit (weight calculator 1106) configured to judge whether or not to change the directivity of the transmission radio signal to be transmitted to the first counterpart radio communication device, on the basis of the first fluctuation state; and a transmission controller (adaptive processing controller 1107) configured to change the directivity of the transmission radio signal to be transmitted to the first counterpart radio communication device, on the basis of the first fluctuation state and the second fluctuation state when the judgement unit judges that the directivity of the transmission radio signal to be transmitted to the first counterpart radio communication device is to be changed.

According to the aspect, the radio communication device transmits the transmission radio signal with the null directed to the position where the first counterpart radio communication device is located at the reception time of the first received radio signal, to the first counterpart radio communication device, depending on the fluctuation state of the propagation path to the first counterpart radio communication device. Thus, the radio communication device can reduce transmissions of the transmission radio signal being the null to the moving first counterpart radio communication device, at least by transmitting the transmission radio signal with the null directed to the position where the first counterpart radio communication device is located at the reception time of the first received radio signal, even in the case where fluctuation occurs in the propagation path due to movement of the first counterpart radio communication device, for example.

In other words, according to the aspect, if Space Division Multiple Access is used, the radio communication device can suppress degradation of the communication quality, even in the case where the state of the propagation path to the radio communication device rapidly fluctuates because the communication target radio communication device or the object existing around the radio communication device moves at high speed.

A seventeenth aspect of the present invention is summarized as the radio communication device according to the sixteenth aspect of the present invention, wherein, when transmitting the transmission radio signal to the first counterpart radio communication device, the transmission controller transmits the transmission radio signal with a beam directed to the second counterpart radio communication device.

An eighteenth aspect of the present invention is summarized as the radio communication device according to the seventeenth aspect of the present invention, wherein, when transmitting the transmission radio signal to the first counterpart radio communication device, the transmission controller transmits the transmission radio signal with a null directed to the second counterpart radio communication device.

A nineteenth aspect of the present invention is summarized as the radio communication device according to the seventeenth aspect of the present invention, wherein the first propagation path is state detector detects a first cycle of fluctuation (first cycle of fluctuation $f_A$) in which the state of the propagation path to the first counterpart radio communication device fluctuates, on the basis of the first received radio signal, the second propagation path state detector detects a second cycle of fluctuation (second cycle of fluctuation $f_B$) in which the state of the propagation path to the second counterpart radio communication device fluctuates, on the basis of the second received radio signal, and the judgment unit judges whether or not to transmit the transmission radio signal with the null directed to the first counterpart radio communication as device, on the basis of the first cycle of fluctuation and the second cycle of fluctuation.

According to the aspect, the radio communication device can judge whether or not to transmit the transmission signals with the null directed to the first counterpart radio communication device in consideration of the first cycle of fluctuation and the second cycle of fluctuation.

A twentieth aspect of the present invention is summarized as the radio communication device according to the nineteenth aspect of the present invention, wherein the judgment unit makes a comparison between the first cycle of fluctuation detected by the first propagation path state detector and processing time from the time of receiving the first received radio signal from the first counterpart radio communication device to the time of transmitting the transmission radio signal, and a so makes a comparison between the second cycle oat fluctuation detected by the second propagation path state detector and processing time from the time of receiving the second received radio signal from the second counterpart radio communication device to the time of transmitting the transmission radio signal, and the transmission controller transmits the transmission radio signal with the null directed to the position where the first counterpart radio communication device is located at the time of receiving the first received radio signal, on the a basis of the comparison result between the processing time and the first cycle or fluctuation by the judgment unit, and the comparison result between the processing time and the second cycle of fluctuation by the judgment unit.

A twenty-first aspect of the present invention is summarized as the radio communication device according to the twentieth aspect of the present invention, wherein, when the judgment unit judges that the processing time falls within a predetermined range corresponding to the first cycle of fluctuation and that the processing time falls within a predetermined range corresponding to the second cycle of fluctuation, the transmission controller transmits the transmission radio signal with the null directed to the position where the first counterpart radio communication device is located at the time of receiving the first received radio signal.

A twenty-second aspect of the present invention is summarized as the radio communication device according to the twenty-first aspect of the present invention, wherein the transmission controller transmits the transmission radio signal with the null as directed to the position where the first counterpart radio communication device is located at the time of receiving the first received radio signal and with the beam directed to the second counterpart radio communication device.

According to the aspect, since the radio communication device transmits the transmission radio signal with the null directed to the position where the first counterpart radio communication device is located at the reception time of the first received radio signal and with the beam directed to the second counterpart radio communication device if the processing time falls within the predetermined range according to the first cycle of fluctuation and the second cycle of fluctuation, the radio communication device can suppress interference to the second counterpart radio communication device by the transmission radio signal in consideration of the fluctuation of the propagation path in transmitting the transmission radio signal.

A twenty-third aspect of the present invention is summarized as the radio communication device according to the twentieth aspect of the present invention, wherein, when the judgement unit judges that the processing time falls within the predetermined range corresponding to the first cycle of fluctuation and that the processing time is out of the predetermined range corresponding to the second cycle of fluctuation, the transmission controller transmits the transmission radio signal with the null directed to the position where the first counterpart radio communication device is located at the time of receiving the first received radio signal and with the null directed to the second counterpart radio communication device.

A twenty-third aspect of the present invention is summarized as the radio communication device according to the twentieth aspect of the present invention, wherein the first propagation path state detector detects a cycle of Doppler variation of each of the first is received radio signal as the first cycle of fluctuation, and the second propagation path state detector detects a cycle of Doppler variation of each of the second received radio signal as the second cycle of fluctuation.

According to the aspect, the radio communication device can detect the cycle of fluctuation more accurately from the cycle of Doppler variation.

A twenty-fifth aspect of the present invention is summarized as the radio communication device according to the nineteenth aspect of the present invention, wherein the first propagation path state detector detects a cycle of fluctuation of an electric power value of each of the first received radio signal as the first cycle of fluctuation, and the second propagation path state detector detects a cycle of fluctuation of an electric power vale of each of the second received radio signal as the second cycle of fluctuation.

According to the aspect, the radio communication device can detect the cycle of fluctuation of the state of the propagation path more accurately from the cycle of fluctuation of the electric power value of the received radio signal.

A twenty-sixth aspect of the present invention is summarized as the radio communication device according to the sixteenth aspect of the present invention, further comprising: an antenna correlation detector (antenna correlation detector 1121) configured to detect degrees of correlation between the first reception radio signals respectively received by the plurality of as element antennas, wherein the transmission controller transmits the transmission radio signal with the null directed to the position where the first counterpart radio communication device is located at the time of receiving the first received radio signal, on the basis of the degrees of correlation detected by the antenna correlation detector.

According to the aspect, on the basis of the degrees of correlation of the received radio signal at respective element antennas, the radio communication device can transmit the transmission radio signal in consideration of the state of the propagation path depending on whether the degree of correlation is high or low.

A twenty-seventh aspect of the present invention is summarized as the radio communication device according to the sixteenth aspect of the present invention, further comprising: an antenna selector (antenna selector 1113) configured to select at least any one of the element antennas on the basis of at least the state of the first received radio signal or the second received radio signal, wherein the transmission controller transmits the transmission radio signal via the element antenna selected by the antenna selector.

According to the aspect, since the radio communication device transmits the transmission radio signal via one of the element antennas depending on the state of the first or the second received radio signal, the radio communication device can reduce transmissions of the transmission radio signal with the null directed, to the first counterpart radio communication device at the transmission time of the transmission radio signal, by an appropriate element antenna depending on the fluctuation state of the propagation path.

A twenty-eighth aspect of the present invention is summarized as the radio communication device according to the twenty-seventh aspect of the present invention, wherein the antenna selector selects an element antenna having a small electric power value of the first received radio signal, if the first fluctuation state falls within, predetermined range.

A twenty-ninth aspect of the present invention is summarized as the radio communication device according to the twenty-seventh aspect of the present invention, wherein the antenna selector selects an element antenna having a large electric power value of so the first received radio signal, if the first fluctuation state is out of the predetermined range.

A thirtieth aspect of the present invention is summarized as the radio communication device according to the twenty-eighth a or twenty-ninth aspect of the present invention, wherein the antenna selector selects an element antenna having a small electric power value of the second received radio signal, if the second fluctuation state is out of the predetermined range.

A thirty-first aspect of the present invention is summarized as the radio communication device according to the twenty-eighth or twenty-ninth aspect of the present invention, wherein the antenna selector selects an element antenna having a large electric power value of the second received radio signal, if the second fluctuation state is out of the predetermined range.

A thirty-second aspect of the present invention is summarized as a radio communication method used in a radio communication device configured to adaptively control directivity of a transmission radio signal by use of a plurality of element antennas, the radio communication method comprising: a first detection step of detecting a first fluctuation state that is a fluctuation state of a propagation path to a first counterpart radio communication device, on the basis of a first received radio signal received from the first counterpart radio communication device; a second detection stop of detecting a second fluctuation state that is a fluctuation state of a propagation path to a second counterpart radio communication device, on the basis of a second received radio signal received from the second counterpart radio communication device, a judgment step of judging whether or not to change the directivity of the transmission radio signal to be transmitted to the first counterpart radio communication device, on the basis of the first fluctuation state; and a control step of changing the directivity of the transmission radio signal to be transmitted to the first counterpart radio communication device, on the basis of the first fluctuation state and the second fluctuation state, when it is judged that the directivity of the transmission radio signal to be transmitted to the first counterpart radio communication device is to be changed in the judgment step.

According to the aspect, it is possible to provide a radio communication device and radio communication method that can suppress even degradation of the communication quality of a second radio communication terminal performing space division multiple access to a first radio communication terminal when a radio signal is transmitted from a radio base station to the first radio communication terminal if communications through the use of Space Division Multiple Access scheme are performed between the radio base station and a plurality of radio communication terminals.

BRIEF DESCRIPTION OF THE DRAWINGS

FIG. 12 is a chart showing one example of various values to calculate when the radio base station according to the third embodiment of the present invention calculates a weight.

BEST MODES FOR CARRYING OUT THE INVENTION

Figure 1:
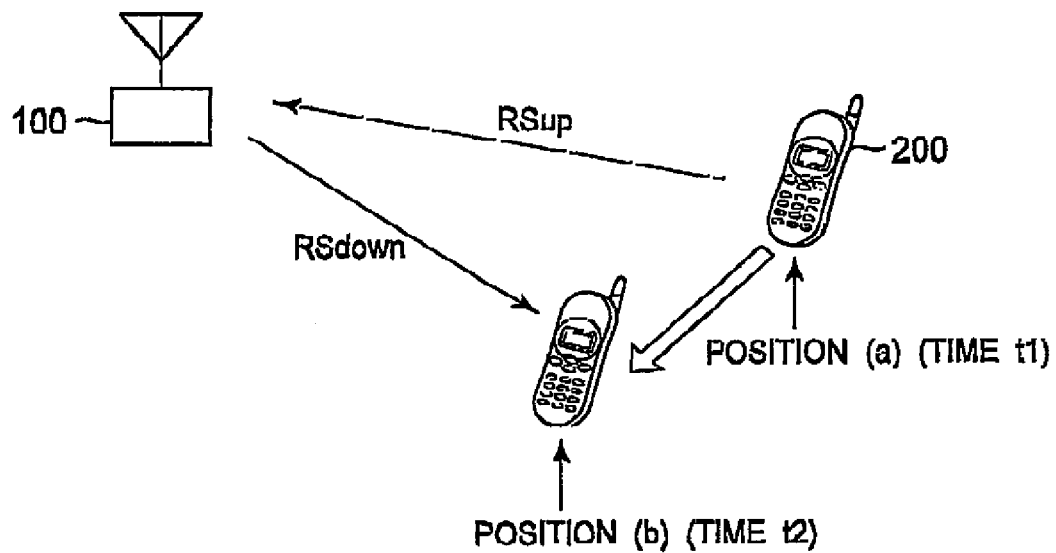
FIG. 1 is an overall schematic configuration diagram of a mobile communication system according to a first embodiment of as the present invention.

Next, embodiments of the present invention will be described. In the following description of the drawings, note that a same or is similar reference numeral is given to a same or similar part. However, it should be noted that the drawings are schematic.

First Embodiment of the Present Invention

Overall Schematic Configuration of Mobile Communication System According to First Embodiment FIG. 1 is an overall schematic configuration diagram of a mobile communication system including a radio communication device according to the present embodiment. The mobile communication system is provided with a radio base station 100 (radio communication device) and a radio communication terminal 200 (counterpart radio communication device). Note that the number of the radio base stations and the radio communication terminals configuring the mobile communication system is not limited to the number shown in FIG. 1.

In the mobile communication system, radio communications are performed between the radio base station 100 and the radio communication terminal 200. The mobile communication system uses Time Division Multiple Access/Time Division Duplex (TDMA/TDD).

The radio communication terminal 200 is a mobile phone terminal provided with functions of transmitting and receiving voice communications or emails. In addition, mobile devices such as a mobile phone, a PDA (Personal Digital Assistant), or a notebook computer are assumed for the radio communication terminal 200.

In addition, FIG. 1 shows an image of the radio communication terminal 200 transmitting an uplink signal RSup at a position (a) at the time t1, and receiving a downlink signal RSdown when moving is to a position (b) at the time t2.

The radio base station 100 performs adaptive array control by using a plurality of element antennas. Specifically, the radio base station 10 adaptively controls directivity of the downlink signal RSdown (transmission radio signal) to transmit to the radio communication terminal 200 that is a communication target radio communication device, on the basis of the uplink signal. RSup (received radio signal) received from the radio communication terminal 200.

Figure 2:
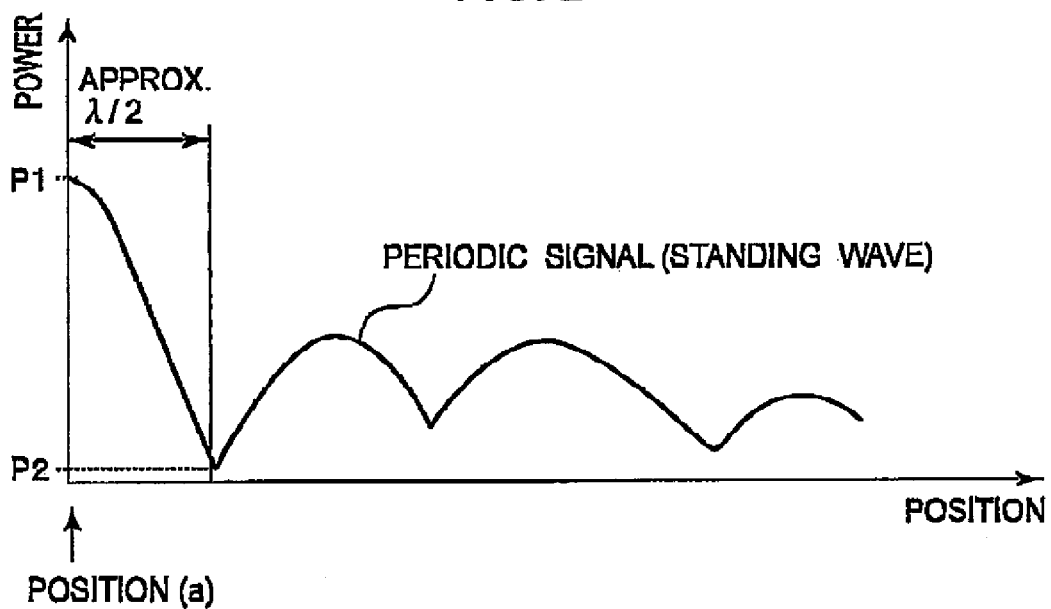
FIG. 2 is a chart showing a periodic signal (standing wave) around a radio communication device according to the first embodiment of the present invention.

In the radio communication terminal 200, a propagation path fluctuates duo to change of surroundings such as movement of the radio communication terminal 200 itself or movement of an object therearound. Then, around the radio communication terminal 200, periodic signals periodically having peaks of electric power values, such as a standing wave, appear due to radio signals transmitted from the radio base station 100, for example, as shown in FIG. 2.

A distance in such periodic signal from received power P1 of a peak (beam) to received power P2 of a null, i.e., a wavelength of the periodic signal is approximately 7.5 cm on the assumption that the wavelength of the periodic signal is almost half when the frequency of the radio signal is in a 2 GHz band, for example.

Configuration of Radio Base Station According to First Embodiment

Figure 3:
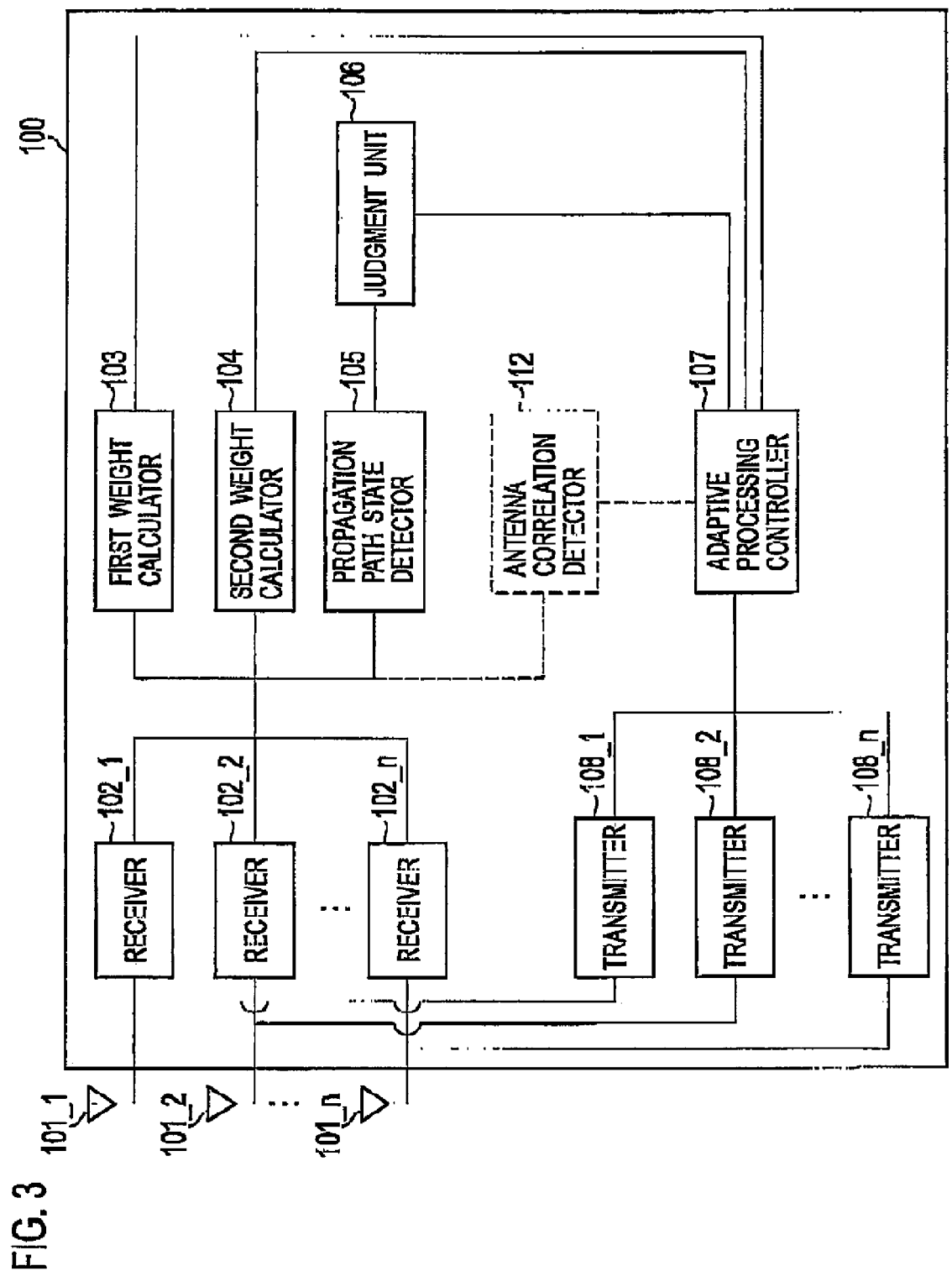
FIG. 3 is a functional block configuration diagram of a radio base station according to the first embodiment of the present invention.

A configuration of the radio base station 100 according to the present embodiment will be described hereinafter. FIG. 3 is a functional block configuration diagram of the radio base station 100 according to the present embodiment. In addition, parts relevant to the present invention will be mainly described in the following. Thus, it should be noted that the radio base station 100 may include a logical block (such as a power supply unit) that is essential in implementing functions and the radio base station 100 but that are not shown or description of which is omitted.

As shown in FIG. 3, the radio base station 100 includes element antennas 101_1 to 101_n, receivers 102_1 to 102_n, a first weight calculator 103, a second weight calculator 104, a propagation path state detector 105, a judgement unit 106, an adaptive processing controller 107, aid transmitters 108_1 to 108_n.

The element antennas 101_1 to 101_n are connected to the receivers 102_1 to 102_n and the transmitters 108_1 to 108_n, and transmit and receive radio signals according to TDMA/TDD to and from the radio communication terminal 200.

The receivers 102_1 to 102_n receive uplink signals RSup from the radio communication terminal 200 via the element antennas 101_1 to 101_n.

The first weight calculator 103 is connected to the receivers 102_1 to 102_n and the adaptive processing controller 107. Based on the uplink signal RSup received by the receivers 102_1 to 102_n, the first weight calculator 103 calculates a first array weight (calculates based on the first array weight calculating method {a standard signal processing method}) to be used in adaptive array control of a downlink signal RSdown to be transmitted to the radio communication terminal 200 so that a peak is directed to the position (a) at the time of reception t1. The first array weight to be calculated by the first weight calculator 103 is used in the adaptive array control of the downlink signal RSdown to be transmitted to the radio communication terminal 200 so that the peak is directed to the position (a) at the time of reception t1. In this case, however, the adaptive array control to be performed based on a the first array weight is normal (standard) adaptive array control (first control method).

The second weight calculator 104 is connected to the receivers 102_1 to 102_n and the adaptive processing controller 107. Based on the uplink signal RSup received by the receivers 102_1 to 102_n, the second weight calculator 104 calculates a second array weight (calculates based on a second array weight calculating method (another signal processing method that is different from the standard signal processing method)) to be used in the adaptive array control of the downlink signal. RSdown to be transmitted to the radio communication terminal 200 so that the null is directed to the position (a) at the time of reception t1. The second array weight to be calculated by the second weight calculator 104 is used in the adaptive array control of the downlink signal RSdown to be transmitted to the radio communication terminal 200 so that the null is directed to the position (a) at the time of reception t1. In this case, however, the adaptive array control based on the second array weight is adaptive array control (second control method) that is different from the normal (standard) adaptive array control to be performed based on the first array weight described above.

The propagation path state detector 105 is connected to the receivers 102_1 to 102_n and the judgment unit 106. The propagation path state detector 105 detects fluctuation state of the propagation path and learns a cycle of fluctuation in which the state of the propagation path to the radio communication terminal 200 fluctuates, on the basis of the detected fluctuation state of the propagation path. The propagation path state detector 105 identifies the fluctuation in the electric power values of the uplink signal RSup received by each of the receivers 102_1 to 102_n, as a cycle of fluctuation fa. Specifically, the propagation path state detector 105 regularly acquires values of the received power that vary as Doppler variation due to movement of the radio communication terminal 200, and also identifies the cycle of fluctuation fa of fluctuation in the values of the received power. The propagation path state detector 105 also notifies the judgment unit 106 of the identified cycle of fluctuation fa.

The judgment unit 106 is connected to the propagation path state detector 105 and the adaptive processing controller 107. The judgment unit 106 also compares processing time Δt with the cycle of fluctuation fa. The processing time Δt is from the time t1 of receiving the uplink signal RSup from the radio communication terminal 200 to the time t2 of transmitting the downlink signal RSdown, and the cycle of fluctuation fa is identified by the propagation path state detector 105. The judgment unit 106 judges whether or not the processing time at is almost half of the cycle of fluctuation fa notified by the propagation path state detector 105.

Specifically, the judgment unit 106 stores in advance a lower limit value fL and an upper limit value fH that represent a range of almost half of the cycle of fluctuation fa being the processing time Δt, and judges whether or not the cycle of fluctuation fa identified by the propagation path state detector 105 satisfies "the lower limit value fL≦fa<the upper limit value fH." The judgment unit also notifies the adaptive processing controller 107 of the result of the judgment. Then, when the judgment unit 106 judges that the cycle of fluctuation fa satisfies the lower limit value fL≦fa<the upper limit value fH, the adaptive processing controller 107, to be described later, performs the adaptive array control (second control method) using the second array weight. By contrast, when the judgment unit judges that the cycle of fluctuation fa does not satisfy the lower limit value fL≦fa<the upper limit value fH, the adaptive processing controller 107, to be described later, performs the adaptive array control (first control method) using the first array weight.

Thus, the judgment unit 106 judges whether or not to change directivity of the downlink signal RSdown, on the basis of the cycle of fluctuation fa. In the present embodiment, the judgment unit 106 constitutes; a judgment unit for judging whether of not to change the directivity of the downlink signal RSdown, on the basis of the fluctuation state of the propagation path detected by the propagation path state detector 105.

The adaptive processing controller 107 is connected to the first weight calculator 103, the second weight calculator 104, the judgment unit 106, and the transmitters 108_1 to 108_n. The adaptive processing controller 107 controls the directivity of the downlink signal RSdown to be transmitted via the element antennas 101_1 to 101_n, on the basis of the cycle of fluctuation fa identified by the propagation path state detector 105. When the judgment unit 106 judges to change the directivity of the downlink signal RSdown, the adaptive processing controller 107 changes the control method to the second control method that is different from the first control method, and processes the downlink signal RSdown according to the second control method.

Here, based on the result of the comparison (judgment result) between the processing time Δt and the cycle of fluctuation fa made by the judgment unit 105 on the basis of the cycle of fluctuation fa identified by the propagation path state detector 105, the adaptive processing controller 107 transmits the downlink signal RSdown with the null directed to a position where the radio communication terminal 200 is located at the reception time of the so uplink signal RSup.

Specifically, when the judgment unit 106 judges that the processing time Δt is almost half of the cycle of fluctuation fa, the adaptive processing controller 107 controls the transmitters 108_1 to 101_n by use of uses the second array weight so as to transmit the downlink signal RSdown an that the null is directed to the position where the radio communication terminal 200 is located at the reception time of the uplink signal RSup.

In addition, when the judgment unit 106 judges that the processing time Δt is not almost half of the cycle of fluctuation fa, the adaptive processing controller 107 controls the transmitters 108_1 to 108_n by use of the first weight so as to transmit the downlink signal RSdown so that the peak (beam) is directed to the position where the radio communication terminal 200 is located at the reception time of the uplink signal RSup.

The adaptive processing controller 107 according to the present embodiment includes a transmission controller for processing the downlink signal RSdown, according to the first control method or the second control method that adaptively controls the directivity of the downlink signal RSdown.

The transmitters 108_1 to 108_n performs the adaptive array processing according to control by the adaptive processing controller 107, and transmits the downlink signal RSdown to the radio communication terminal 200 via the element antennas 101_1 to 101_n.

Operation of Radio Base Station According to First Embodiment

Figure 4:
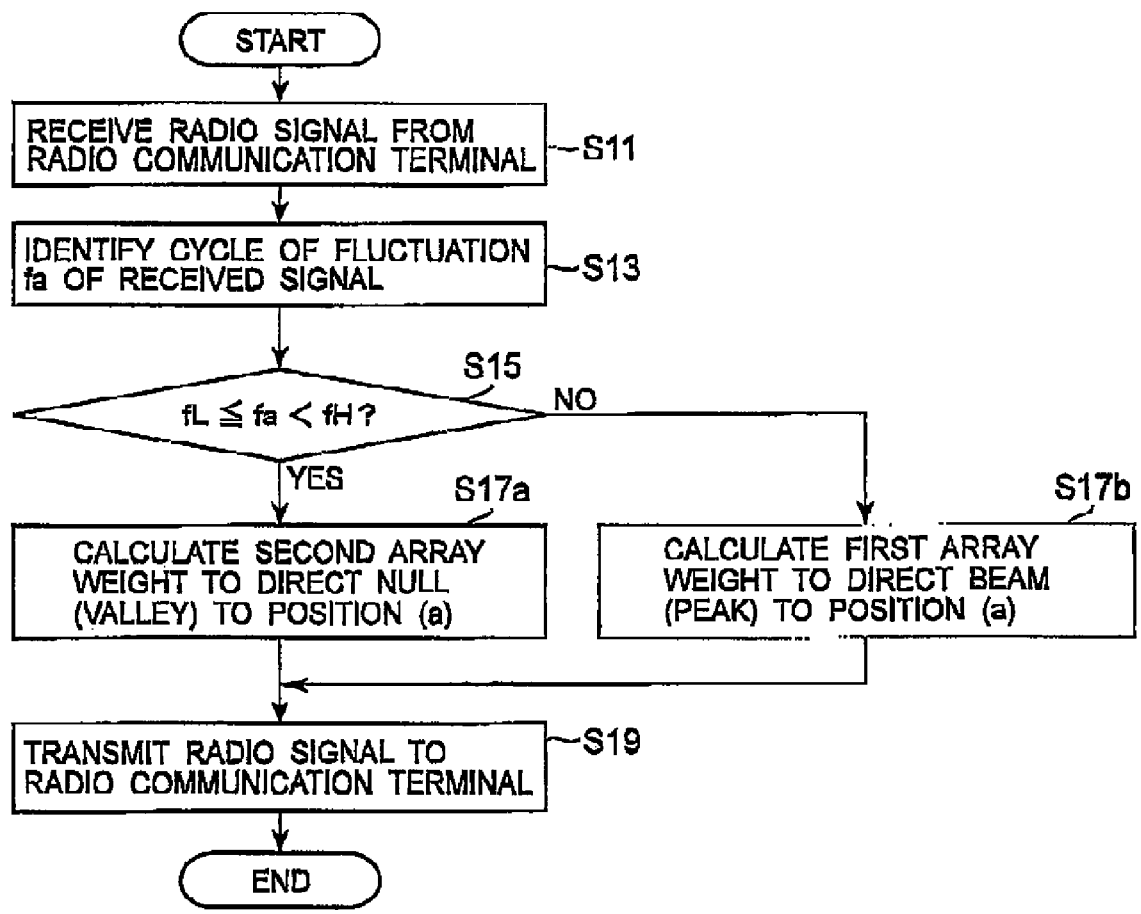
FIG. 4 is an operation flowchart in the radio base station according to the first embodiment of the present invention.

The operation of the aforementioned radio base station 100 will be described hereinafter with reference to FIG. 4. Specifically, description will be given of control operation at the time when the radio base station 100 transmits a downlink signal RSdown (transmission radio signal) by using adaptive array control on the basis of an uplink signal RSup (received radio signal).

In step S11, the radio base station 100 receives a radio signal of the uplink signal RSup transmitted from the radio communication terminal 200.

In step S13, the propagation path state detector 105 identifies the cycle of fluctuation fa of the received uplink signal RSup. The propagation path state detector 105 also notifies the judgment unit 106 of the identified cycle of fluctuation fa.

Figure 5:
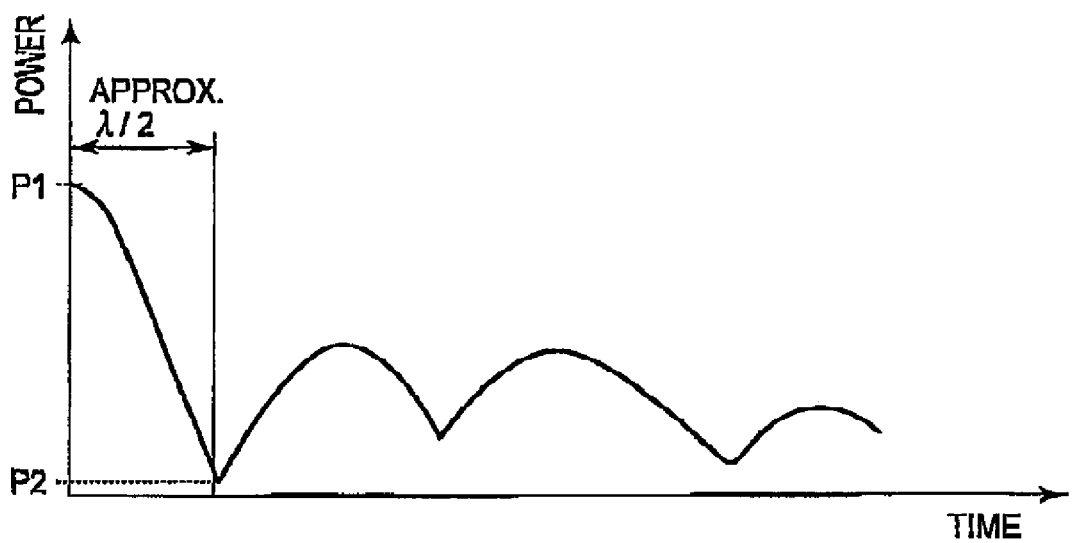
FIG. 5 is a chart showing fluctuation of received power due to fluctuation in an uplink propagation path.

Here, FIG. 5 shows a relation of received power values on the time axis that are acquired by the propagation path state detector 105. As shown in FIG. 5, in the propagation path state detector 105, since the propagation path changes due to movement of the radio communication terminal 200, received power values periodically fluctuate over time. The propagation path state detector 105 identifies the fluctuation as the cycle of fluctuation fa.

In step S15, the judgment unit 16 judges whether or not the notified cycle of fluctuation fa satisfies fL≦fa<fH.

In step S17a, when the judgment unit 106 judges that the cycle so of fluctuation fa satisfies fL≦fa<fH (when fL≦fa<fH is YES), the adaptive processing controller 107 instructs the second weight calculator 104 to calculate a second array weight. The second array calculator 104 calculates the second array weight and makes notification to the adaptive processing controller 107.

In step S17b, when the judgment unit 106 judges that the cycle of fluctuation fa does not satisfy fL≦fa<fH (when fL<fa<fH is NO), the adaptive processing controller 107 instructs the first weight calculator 103 to calculate a first array weight. The first weight calculator 103 calculates the first array weight and makes notification to the adaptive processing controller 107.

In step S19, using the first array weight or the second array weight, the adaptive processing controller 107 transmits the downlink signal RSdown from the transmitters 108_1 to 108_n.

Operations and Effects of Radio Base Station According to First Embodiment

According to the radio base station 100 of the present embodiment, if it is judged that the processing time Δt is almost half of the cycle of fluctuation fa of the received power values of the uplink signal RSup transmitted from the radio communication terminal 200, the adaptive array control of the downlink signal RSdown to be transmitted to the radio communication terminal 200 so that a null is directed to a position (a) is performed by using the second array weight.

Figure 6:
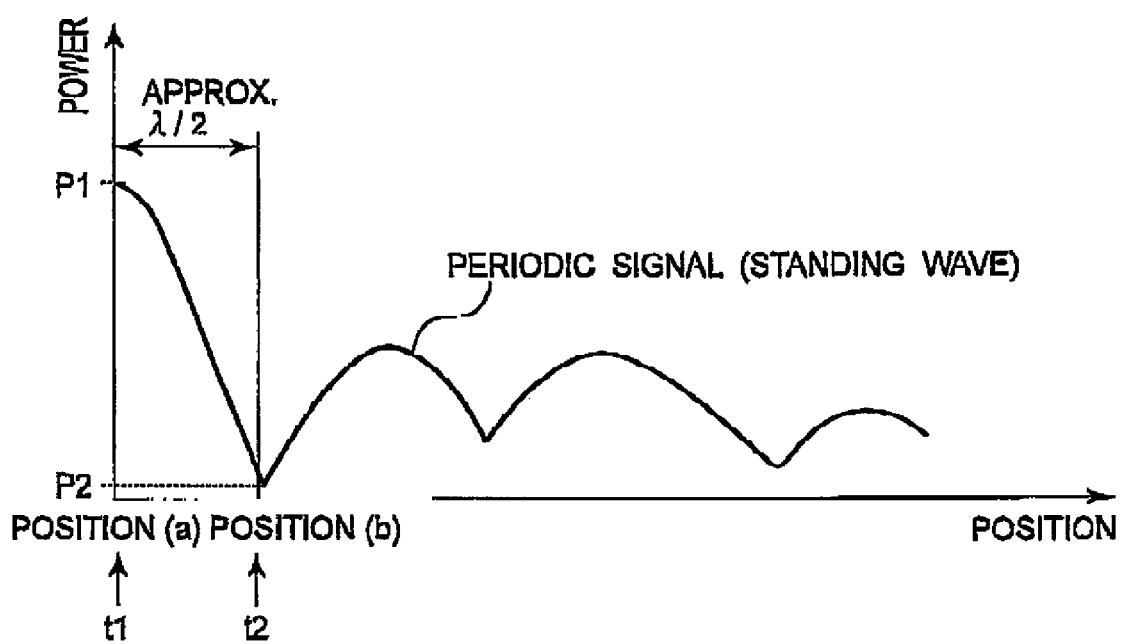
FIG. 6 is a chart showing the periodic signal (standing wave) around a radio communication terminal according to the first embodiment of the present invention.

For example, when the radio communication terminal 200 moves to a position (b) that is almost half of the cycle of fluctuation fa during the processing time Δt from the time t1 to the time t2, radio base station 100 according to the conventional technique performs the adaptive array control on the basis of the uplink signal RSup at the position (a) at the time t1, and transmits the downlink signal RSdown so as to have received power P1 of a peak at the position (a) at the time t2, as shown in FIG. 6. Thus, in the radio communication terminal 200 that moves to the position (b) at the time t2, the received power received has sharply dropped to received power P2 of null.

Figure 7:
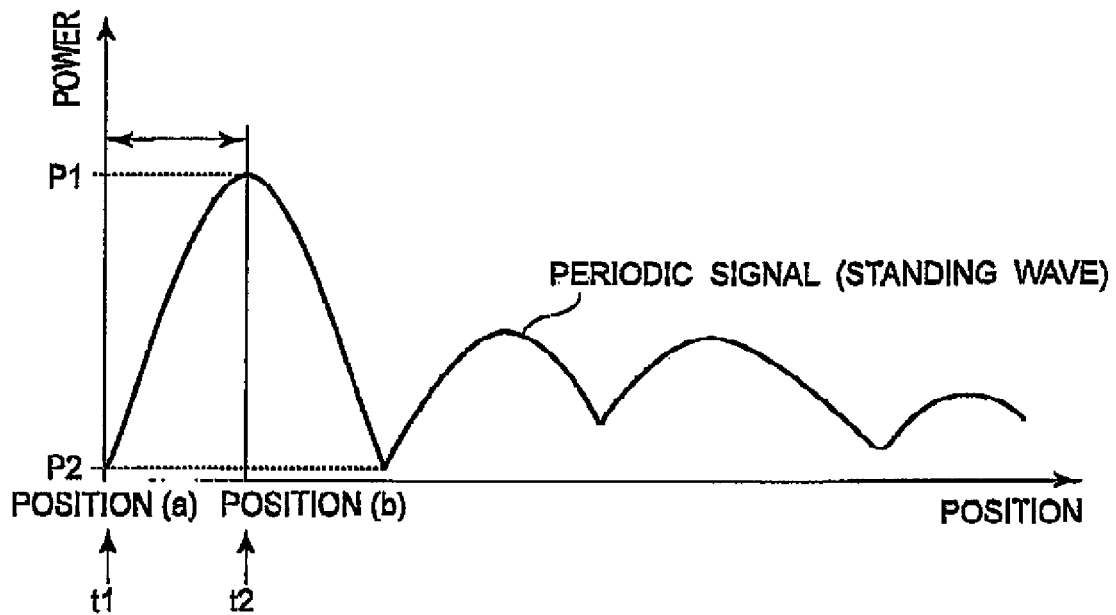
FIG. 7 is a chart showing the periodic signal (standing wave) around the radio communication terminal according to the first embodiment of the present invention.

According to the radio base station 100 of the present embodiment, when the radio communication terminal 200 moves a distance that is almost half of a wavelength λ during the processing time Δt from the time t1 to the time t2, for example, as shown in FIG. 7, the adaptive array control by using the second array weight is performed so as to have the received power P2 of null at the position (a) at the time t2, and the downlink signal RSdown is transmitted. Thus, in the radio communication terminal 200, the received power to be received at the position (b) of the time t2 is received not with the received power P2 of at least null, but with the received power P1 of the peak, for example.

In this way, according to the radio base station 100, degradation of the communication quality can be suppressed even in the case where the state of the propagation path to the radio communication terminal 200 rapidly fluctuates because the communication target radio communication terminal 200 or the object existing around the communication target radio communication terminal 200 moves at high speed (100 kg/h or higher).

(Modification 1)

The present invention shall not be limited to the above embodiment and various changes may be made thereto. In the first embodiment, for example, the propagation path state detector 105 of the radio base station 100 identifies fluctuation in electric power values of the uplink signal RSup received by the receivers 102_1 to 102_n as the cycle of fluctuation fa. However, the propagation path state detector 105 may detect and identify Doppler variation of the uplink signal RSup as the cycle of fluctuation fa. Then, the Doppler variation identified as the cycle of fluctuation represents frequency of the uplink signal RSup that Doppler-changes according to the traveling speed of the radio communication terminal 200. In addition, the propagation path state detector 105 notifies the judgment unit 106 of the identified cycle of fluctuation fa.

The judgment unit 106 judges whether or not the radio communication terminal 200 travels a distance that is almost half of the wavelength λ of the frequency f being used by the radio signal.

Specifically, storing in advance a lower limit value fL and an upper limit value fH of the Doppler variation that corresponds to the traveling speed at the time when the radio communication terminal travels the distance which is almost half of the wavelength λ of the frequency f being used by the radio signal, the judgment unit 106 judges whether or not the cycle of fluctuation fa identified by the propagation path state detector 105 satisfies fL≦fa<fH. The judgment unit 106 notifies the adaptive processing controller 107 of the result of the judgment. In addition, since other configurations are similar to the radio bass station 100 according to the first embodiment described above, description thereof will be omitted.

As described above, if it is judged that the cycle of fluctuation fa falls within the range from the lower limit value fL to the upper limit value fH of the Doppler variation that corresponds to the traveling speed at the time when the radio communication terminal travels the distance which is almost half of the wavelength λ, the radio base station 100 according to the modification 1 performs the adaptive array control by using the second array weight so as to have the received power of the null at the position (a) at the time t2, and transmits the downlink signal. RSdown. Thus, in the moving radio communication terminal 200, received power to be received at the position (b) at the time t2 is received not as the received power P2 of at least the null but as the received power P1 of the peak, for example. Thus, in the radio communication terminal 200, the received power to be received at the position (b) at the time t2 is received not as the received power P2 of at least the null but as power other than null, for example, the received power P1 of the peak.

In this way, the radio base station 100 can suppress degradation of the communication quality even in the case where the state of the propagation path to the radio communication terminal 200 rapidly fluctuates because the communication target radio communication terminal 200 or the object existing around the communication target radio communication terminal 200 moves at high speed (100 km/h or higher).

(Modification 2)

The present invention shall not be limited to the above embodiments and various charges may be made thereto. As shown in FIG. 3, the radio base station 100 according to the first embodiment may further include an antenna correlation detector 112.

The antenna correlation detector 112 is connected to the receivers 102_1 to 102_n and the adaptive processing controller 107. The antenna correlation detector 112 detects a degree of correlation of uplink signals RSup received by each of the plurality of element antennas 101_1 to 101_n. Specifically, the antenna correlation detector 112 detects the degree of correlation with the plurality of element antenna 101_1 to 101_n on the basis of a phase and amplitude of the uplink signal RSup received by each of the receivers 102_1 to 102_n. Here, if the degree of correlation detected by the antenna correlation detector 112 is high, it is likely in the radio communication terminal 200 that a difference between the received power value P1 being the peak and the received power value P2 being the null in the cycle of fluctuation fa due to the fluctuation of the propagation path is small in the periodic signal (e.g., standing wave) therearound. In addition, the antenna correlation detector 112 notifies the adaptive processing controller 107 of the detected degree of correlation.

Based on the degree of correlation detected by the antenna correlation detector 112, the adaptive processing controller 107 transmits a downlink signal RSdown with the null directed to the position (a) where the radio communication terminal 200 is located at the reception time t1 of the uplink signal RSup, according to the second control method.

Specifically, only if the detected degree of correlation is less than or equal to the predetermined degree of correlation that has boon stored in advance and the judging device 106 judges that the processing time Δt is almost half of the cycle of fluctuation fa, the adaptive processing controller 107 controls the transmitters 108_1 to 108_n to transmit the downlink signal RSdown so that the null is directed to the position where the radio communication terminal 200 is located at the reception time of the uplink signal RSup, according to the second control method that uses the second array weight. In addition, in any case other than this, the adaptive processing controller 107 performs processing so that the transmitters 108_1 to 108_n transmit the downlink signal RSdown so that the peak is directed to the position where the radio communication terminal 200 is located at the reception time of the uplink signal RSup, according to the first control signal that uses the first array weight. In addition, since other configurations are similar to the radio base station 100 according to the first embodiment described above, description thereof will be omitted.

As described above, with the radio base station 100 according to the present modification, only if the degree of correlation detected by the antenna correlation detector 112 is less than or equal to the predetermined degree of correlation, that is, if there is a difference between the received power value P1 of the peak and the received power value P2 of the null in the periodic signal (standing wave) around the radio communication terminal 200, the adaptive processing controller 107 performs the adaptive array control by using the second array weight and transmits the downlink signal RSdown so that the received power P2 is null at the position (a) at the time t2. Consequently, in consideration of a difference between the received power value P1 of the peak and the received power value P2 of the null in a periodic signal around the radio communication terminal 200, the adaptive array control is performed using the second array weight only when the difference is large. Accordingly, it is possible to efficiently transmit the downlink signal RSdown that results in the received power of the peak at the radio communication terminal 200.

Second Embodiment of the Present Invention

In the first embodiment, the radio base station 100 is configured to detect fluctuation in the propagation path by detecting Doppler variation of the uplink signal RSup transmitted from the radio communication terminal 200. In the present embodiment, however, the radio communication terminal 200 detects fluctuation in the propagation path by detecting the Doppler variation of the downlink signal RSdown.

Figure 8:
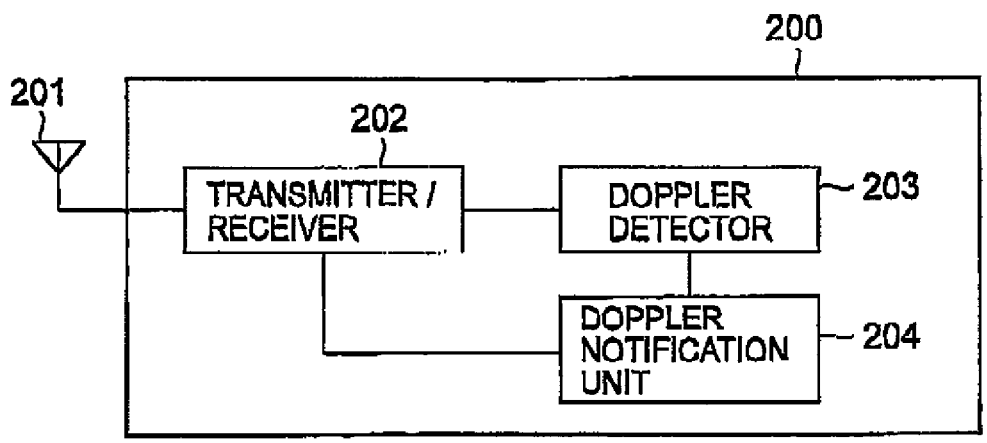
FIG. 8 is a functional block configuration diagram of the radio communication terminal according to a second embodiment of the present invention.

As shown in FIG. 8, the radio communication terminal 200 according to the present embodiment includes a transmitter/receiver 202 for transmitting and receiving a radio signal to and from the radio base station 100 via an antenna 201, a Doppler detector 203 which detects Doppler variation of a downlink signal RSdown, and a Doppler notification unit 204 which notifies the radio base station 100 of Doppler information indicating the Doppler variation detected by the Doppler detector 203, via the transmitter/receiver 202.

In addition, in the radio base station 100 according to the present embodiment, the propagation path state detector 105 acquires the Doppler information notified by the radio communication terminal 200 through the receivers 102_1 to 102_n, and notifies the judgment unit 106 of a cycle of the Doppler variation indicated in the Doppler information, as a cycle of fluctuation in the propagation path. Since other functions are similar to the radio base station 100 according to the first embodiment described above, description thereof will be omitted.

Since the radio base station 100 according to the present embodiment identifies the fluctuation of the propagation path on the basis of the Doppler variation of the downlink signal RSdown detected by the radio communication terminal 200, the radio base station 100 can more accurately identify the fluctuation cycle of the fluctuation on the propagation path on the radio communication terminal 200 side and perform the adaptive array control by using either the first or the second array weight.

Third Embodiment of the Present Invention

Next, a configuration of the radio base station 100 according to a third embodiment of the present invention will be described by focusing on differences from the first embodiment described above. In the following, parts different from the radio base station 100 of the first embodiment will be mainly described and description of similar functions will be omitted as appropriate.

Configuration of Base Station 100 According to Third Embodiment

Figure 9:
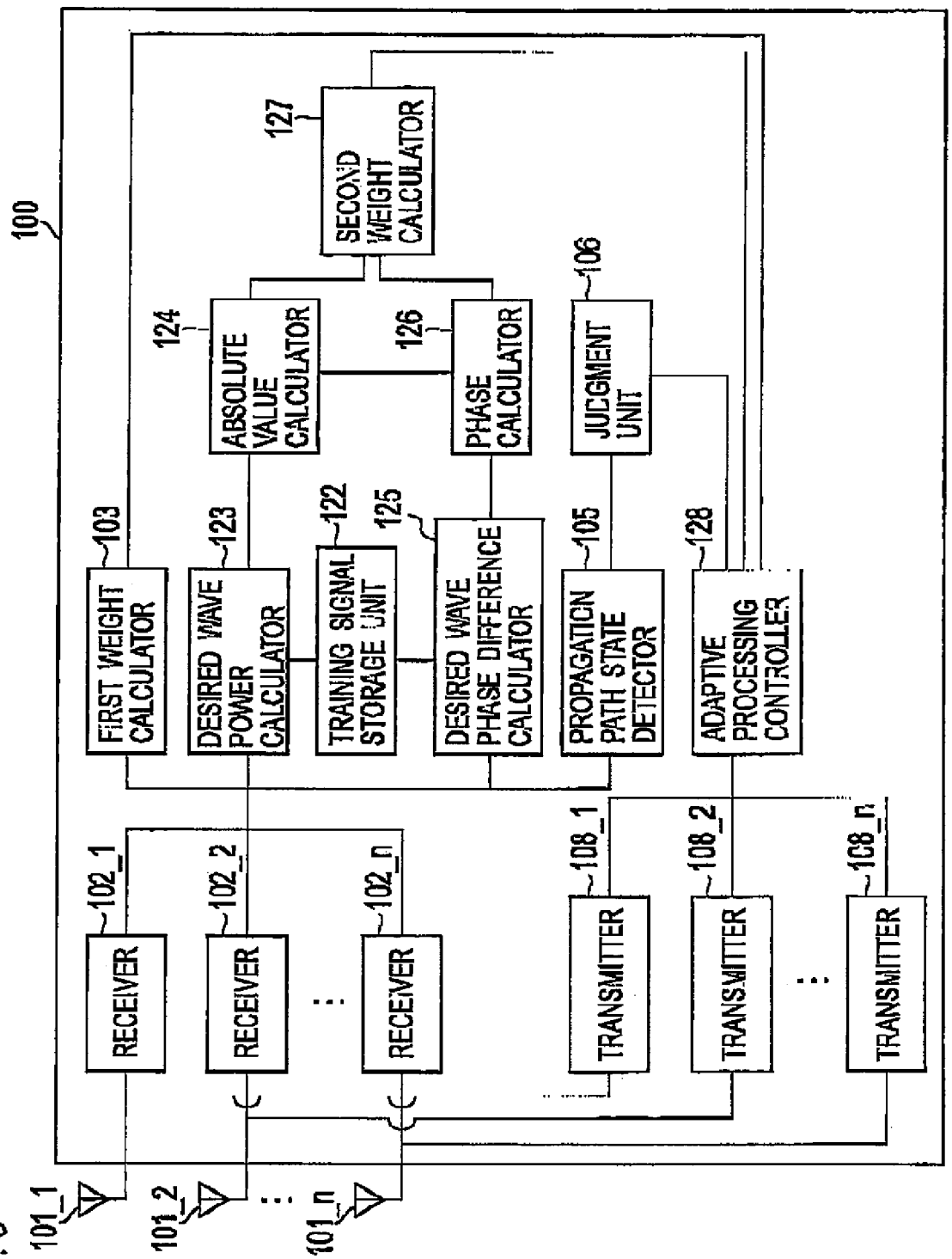
FIG. 9 is a functional block configuration diagram of a radio base station according to a third embodiment of the present invention.

In the present embodiment, the function of calculating a second array weight in the radio base station 100 according to the first embodiment will be described more specifically. As shown in FIG. 9, the radio base station 100 according to the present s30 embodiment further includes a training signal storage unit 122, a desired wave power calculator 123, an absolute value calculator 124, a desired wave phase difference calculator 125, and a phase calculator 126.

The training signal storage unit 122 is connected to the desired wave power calculator 123 and the desired wave phase difference calculator 125.

The training signal storage unit 122 stores a training signal used in radio communications with the radio communication terminal 200. Here, the training signal represents a known signal having known amplitude and phase values.

The desired wave power calculator 123 is connected to the receivers 102_1 to 102_n, the training signal storage unit 122, and the absolute value calculator 124.

The desired wave power calculator 123 calculates desired wave received power, on the basis of the training signal stored in advance in the training signal storage unit 122 and uplink signals RSup received respectively by the receivers 102_1 to 102_n. The desired wave power calculator 123 also notifies the absolute value calculator 124 of the calculated desired wave received power.

The absolute value calculator 124 is connected to the desired wave power calculator 123, the phase calculator 126, and the second weight calculator 127.

Based on the desired wave received power notified by the so desired wave power calculator 123, the absolute value calculator 124 calculates an absolute value of weight to be used in the adaptive array control, by converting values of the desired wave received power so that magnitude thereof is reversed.

The desired wave phase difference calculator 125 is connected to the receivers 102_1 to 102_n, the training signal storage unit 122, and the phase calculator 126.

The desired wave phase difference calculator 125 receives is an uplink signal RSup including the training signal that is transmitted from the radio communication terminal 200 and whose amplitude and phase values are known, and calculates a phase difference between the received training signal (the training signal whose amplitude and phase are affected by fluctuation of the propagation path) and the training signal stored in the training signal storage unit 122. The desired wave phase difference calculator 125 calculates a phase difference between the uplink signals RSup received by each of the plurality of the element antennas 101_1 to 101_n and the training signal. The desired wave phase difference calculator 125 according to the present embodiment constitutes a phase difference calculator.

The phase calculator 126 is connected to the absolute value calculator 124, the desired wave phase difference calculator 125, as and the second weight calculator 127.

Using the absolute value of the weight calculated by the absolute value calculator 124, the phase calculator 126 calculates a phase of the weight to be used for transmission, by correcting the phase difference calculated by the desired wave phase difference calculator 125 so that a null is directed to a position (a) of the radio communication terminal 200 at the time t1.

In addition, the second weight calculator 127 according to the present embodiment calculates a second array weight, by using the absolute value of the weight calculated by the absolute value calculator 124 and the phase calculated by the phase calculator 126.

The second weight calculator 127 also notifies an adaptive processing controller 128 of the calculated second array weight.

The adaptive processing controller 128 is connected to the first weight calculator 103, the judgment unit 106, the second weight calculator 127, and the transmitters 108_1 to 108_n.

Using the phase difference calculated by the desired wave phase difference calculator 125, and according to the second control method, the adaptive processing controller 128 applies, to the downlink signal RSdown, the second array weight with the null directed to the position where the radio communication terminal 200 is located at the reception time of the uplink signal RSup.

When transmitting the downlink signal RSdown by the second control method, the adaptive processing controller 128 applies, to the downlink signal RSdown, the second array weight by which an electric power value of each of the downlink signals RSdown to be transmitted via the plurality of element antennas is small at the position (a) where the radio communication terminal 200 is located at the reception time t1 of the uplink signal RSup, on the basis of a plurality of phase differences calculated by the desired wave phase difference calculator 125 and the electric power value of the uplink signal RSup received by each of the plurality of the element antennas 101_1 to 101_n.

Specifically, when the judgment unit 106 judges that the processing time Δt is almost half of the cycle of fluctuation fa, the adaptive processing controller 128 controls the transmitters 108_1 to 108_n to transmit the downlink signal RSdown so that the null is directed to the position (a) where the radio communication terminal 200 is located at the reception time t1 of the uplink signal RSup, by using the second array weight.

In addition, when the judgment unit 106 judges that the processing time Δt is not almost half of the cycle of fluctuation fa, the adaptive processing controller 128 controls the transmitters 108_1 to 101_n to transmit the downlink signals RSdown so that the peak is directed to the portion (a) where the radio communication terminal 200 is located at the reception time t1 of the uplink signals RSup, by using the first array weight.

In addition, since other configurations of the radio base station 100 according to the present embodiment are similar to the radio base station 100 according to the first embodiment, description thereof will be omitted.

Operation of Radio Base Station According to Third Embodiment

The operation of the radio base station 100 according to the present embodiment will be described. Note that, in comparison with the operation of the radio base station 100 according to the first embodiment described above, the radio base station 100 according to the present embodiment differs only in the operation of step S17a shown in FIG. 4, and thus the operation of the step S17a will be mainly described with reference to FIG. 10 to FIG. 12.

Figure 10:
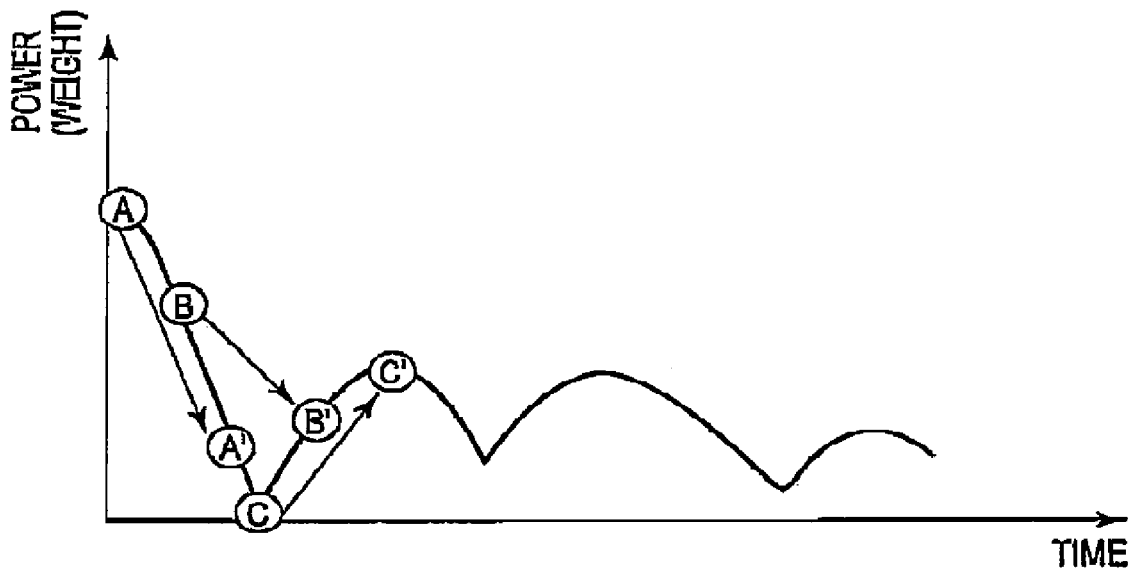
FIG. 10 is a chart showing, in the radio base station according to the third embodiment of the present invention, transmitting and receiving timing of an uplink signal and a downlink signal between the radio base station and the radio communication terminal, and showing fluctuation of power due to fluctuation in the propagation path.

Here, FIG. 10 shows fluctuation in desired wave received power from the moving radio communication terminal 200 in one receiver of the plurality of receivers 102_1 to 102_n.

As shown in FIG. 10, in the radio base station 100, influenced by Doppler variation due to movement of the radio communication terminal 200, the desired wave power received by the receiver fluctuates, when the propagation path state detector detects the fluctuation and it is judged that the propagation path fluctuate so that the radio communication terminal 200 moves to a null of a periodic signal (standing wave) at the transmission time t2 of the downlink signal RSdown, the adaptive array control is performed so that the null is directed to the position (a) of the radio communication terminal 200 at the time t1 (so that the peak is directed to the position (b)).

In addition, at that time, if the desired wave power is like A, B, C as shown in FIG. 10 at the reception time t1 of the uplink signal sup, the radio base station 100 needs to perform transmission with the weight of the absolute values such as A', B', C', respectively.

In addition, since it is likely that magnitude of the desired wave power during reception and of an absolute value of the weight during transmission will be reversed if the propagation path fluctuates so that the radio communication terminal 200 moves to the null of the periodic signal, the absolute value calculator 124 makes correction to reveres the magnitude of the values of the desired wave received power.

Figure 11:
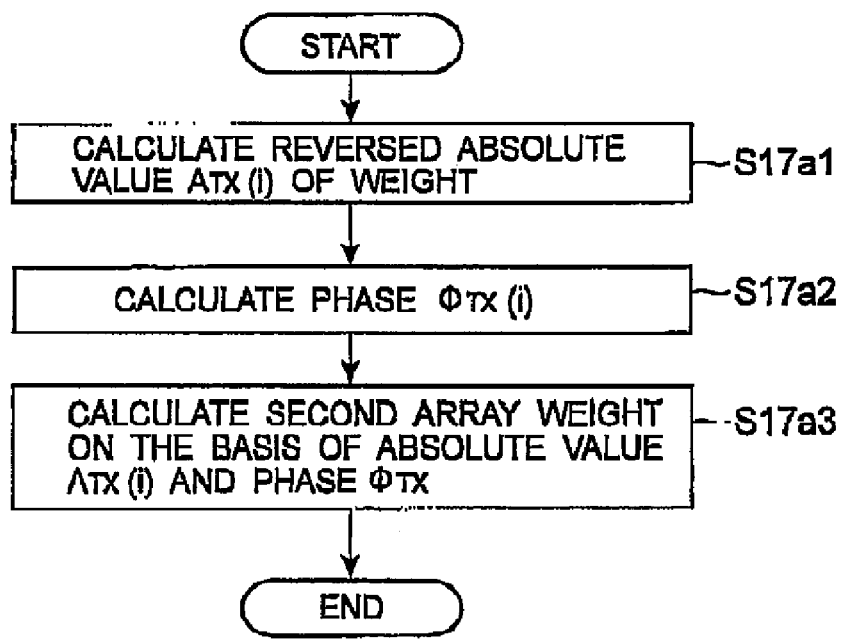
FIG. 11 is an operation flowchart in the radio base station according to the third embodiment of the present invention.

Specifically, where reference power is A and desired wave received power is $A_{Rx}(i)$ in each of the receivers 102_1 to 102_n that are notified by the desired wave power calculator 123 A1, A2, A3 . . . n, the absolute value calculator 124 calculates the absolute values $A_{Tx}(i)$ of the reversed weight after correction as (A-A1), (A-A2), (A-A3), . . . (A-An) (step S17a1 as shown in FIG. 11).

Here, description will be given on the assumption that, as an example, the radio base station 100 includes three receivers 102_1 to 102_3. For example, when the reference power is "1," the desired wave received power A1 at the receiver 101_1 is "0.3," the desired wave received power A2 at the receiver 101_2 is "0.5," and the desired wave received power A3 at the receiver 102 3 is "0.9," the absolute value calculator 124 calculates absolute values of weights of the receivers 102_1 to 102_3 as "0.7," "0.5," and "0.1," respectively.

In addition, the phase calculator 126 calculates a phase difference $\Phi_{Tx}(i)$ for directing the null to the position (a) of the radio communication terminal 200 at the time t1 at the radio base station 100, by using the absolute values $A_{Tx}(i)$ calculated by the absolute value calculator 124; the desired wave received power values $A_{Rx}(i)$ calculated by the desired wave power calculator 123; and the respective phase differences $\Phi_{Rx}(i)$ of the receivers 102_1 to 102_n calculated by the desired wave phase difference calculator 125 (stop S17a2).

Specifically, first, the phase calculator 126 calculates a correction code m(i) by which a value to be calculated by the following expression (1) will be minimum. Then, the correction code m(i) is determined to be a value of either +1 or −1.

In addition, each term is shown as follows:

[Expression 1]

$$|\Sigma(A_{Tx}(i) \times A_{Rx}(i) \times m(i))\{ \qquad \text{Expression (1)}$$

($A_{Tx}(i)$): An absolute value of reversed weight after correction in the $i^{th}$ receiver $A_{Rx}(i)$: Desired wave received power in the $i^{th}$ receiver For example, in the example of FIG. 12, the phase calculator 126 calculates values after multiplying the desired wave received power by each of the absolute values of the weight as "0.21," "0.25," "0.09," in the receivers 102_1 to 102_3.

Then, in the expression (1), for example, the multiplication values corrected so that a sum of the multiplication values is minimum are "−0.21," "0.25," and "0.09," and the correction code m (i) is "−1" "1," and "−1," respectively, in the receivers 102_1 to 102_3.

In addition, the phase calculator 126 calculates a correction term $\Phi(i)$ with a value of either 0 or π from the correction code m(i), by means of the expression (2).

[Expression 2]

$$\Phi(i) = \begin{cases} 0 (m(i) = +1) \\ \pi (m(i) = -1) \end{cases}$$ Expression (2)

Then, the phase calculator 126 calculates a phase $\Phi_{rA}$ from the calculated correction term $\Phi(i)$ by means of the expression (3).

[Expression 3]

$$\Phi_{Tx}(i) = \Phi_{Rx}(i) + \Phi(i)$$ Expression (3)

Additionally, each term is shown as follows:
$\Phi TX(i)$: A phase after correction in the $i^{th}$ receiver
$\Phi Rx(i)$; A phase difference between the reception signal and the training signal in the $i^{th}$ receiver
$\Phi(i)$: A correction term in the $i^{th}$ receiver In addition, the second weight calculator 127 calculates a second array weight W(i) by means of the expression (4), by going the absolute value $A_{Tx}(i)$ calculated by the absolute value calculator 124 and the phase $\Phi RX(i)$ calculated by the phase calculator 126 (step S17a3).

[Expression 4]

$$W(i) = A_{TX} \times \Phi_{TX}(i)$$ Expression (4)

In addition, the adaptive processing controller 128 according to the present embodiment uses the second array weight when the judgment unit 106 judges that the processing time Δt is almost half of the cyclo of fluctuation fa, and the first array weight when the judgment unit judges that Δt is not almost half.

In this way, the second array weight to be applied by the adaptive processing controller 128 is calculated based on the phase $\Phi_{Tx}(i)$ calculated from the plurality of phase differences $\Phi_{Rx}(i)$ calculated by the desired wave phase difference calculator 125 and the absolute value $A_{Rx}(i)$ calculated from the desired wave received power values calculated by the desired wave power calculator 123. In addition, the adaptive processing controller 120 uses the second array weight, and the electric power value of the downlink signal RSdown to be transmitted via the plurality of element antennas is small at the position (a) where the radio communication terminal 200 is located at the reception time t1 of the uplink signal RSup.

Operations and Effects of Radio Base Station According to Third Embodiment

If it is judged that the processing time Δt falls within the range from the lower limit value fL to the upper limit value fH of almost half of the cycle of fluctuation fa of an uplink signal transmitted from the radio communication terminal 200, the radio base station 100 according to the present embodiment performs adaptive array control to transmit the downlink signal RSdown to the radio communication terminal 200 so that the null is directed to the position (a) by using the second array weight.

Consideration has been given to the second array weight so that an electric power value of the downlink signal RSdown is small at the position (a) where the radio communication terminal (a) is located at the reception time t1 of the uplink signal RSup. The downlink signal RSdown is transmitted via the plurality of element antennas on the basis of a phase $\Phi_{Tx}(i)$ calculated from multiple phase differences and an absolute value $A_{Tx}(i)$ calculated from a desired wave received power value $A_{Rx}(i)$.

As described above, the radio base station 100 according to the present embodiment can transmit the downlink signal RSdown with a peak directed to the radio communication terminal 200 in consideration of fluctuation of the propagation path. This can suppress degradation of the communication quality even in the case where the state or the propagation path to the radio communication terminal 200 rapidly fluctuates because the communication target radio communication terminal 200 or an object existing around the communication target radio communication terminal 200 moves at high speed (100 km/h or higher).

Fourth Embodiment

A configuration of a radio base station 100 according to a fourth embodiment of the present invention will be described hereinafter, focusing on differences from the first embodiment described above. In the following, parts different from the radio base station 100 of the first embodiment will be mainly described and description of similar functions will be omitted as appropriate.

Configuration of Radio Base Station 100 According to the Fourth Embodiment

Figure 13:
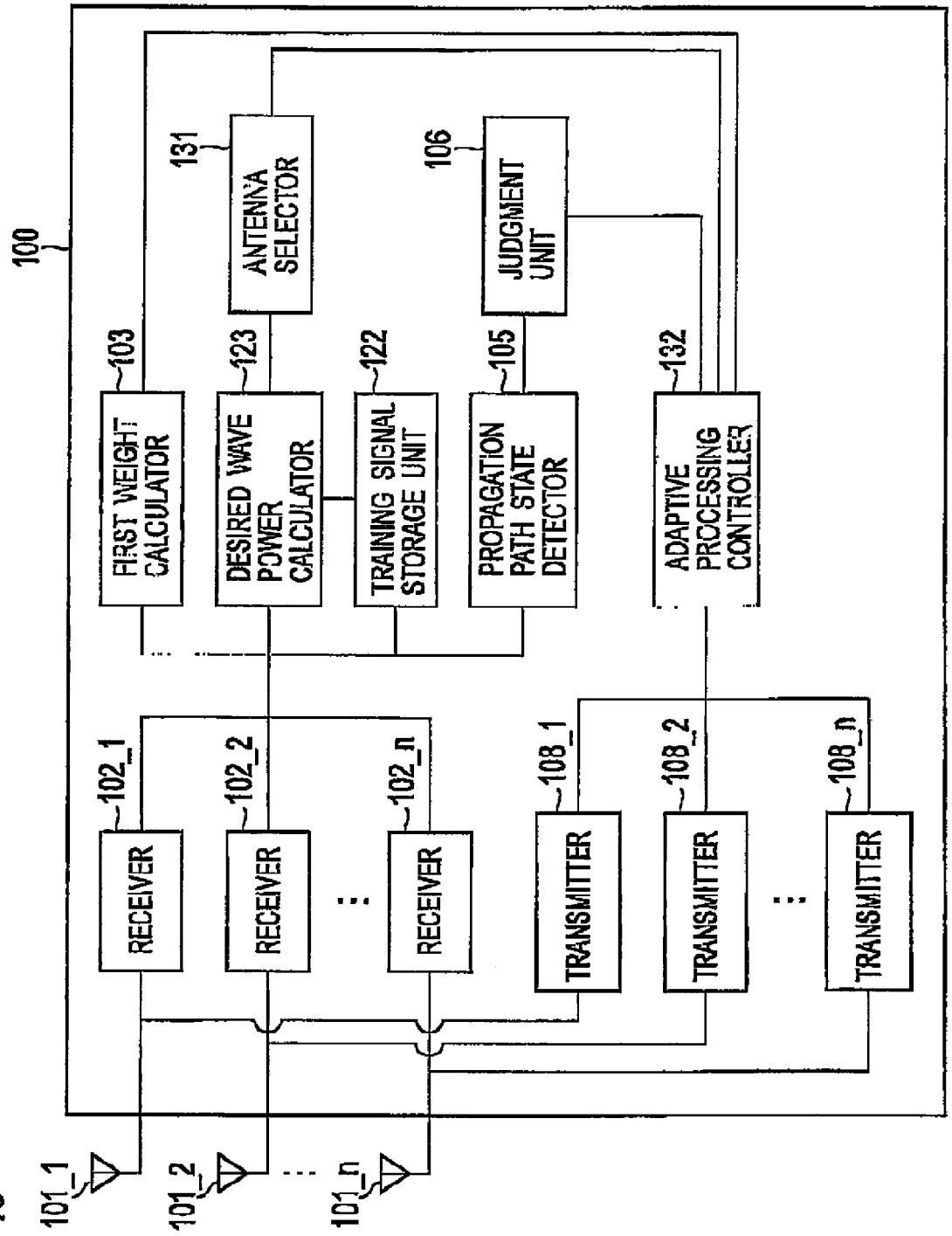
FIG. 13 is a functional block configuration diagram of a radio base station according to a fourth embodiment of the present invention.

As shown in FIG. 13, rather than including the second weight calculator 104 the radio base station 100 of the first embodiment is provided with, the radio base station 100 according to the present embodiment newly includes a training signal storage unit 122, a desired wave power calculator 123, and an antenna selector 131. Note that, since configurations of the training signal storage unit 122 and the desired wave power calculator 123 similar to the third embodiment described above, description the eof will be omitted.

The antenna selector 131 is connected to the desired wave power calculator 123 and an adaptive processing controller 132. The antenna selector 131 is capable of selecting at least any of element antennas 101_1 to 101_n on the basis of the state of an uplink signal RSup. Then, the antenna selector 131 selects any of the element antennas 101_1 to 101_n which has the lowest electric power value from among the element antennas 101_1 to 101_n.

Specifically, the antenna selector 131 selects any of the element antennas 101_1 to 101_n which has the lowest desired wave received power value on the basis of the desired wave received power so value of each of receivers 102_1 to 102_n calculated by the desired wave power calculator 123. The antenna selector 131 also notifies the adaptive processing controller 132 of the selected one of the element antennas 101_1 to 101_n.

The adaptive processing controller 132 according to the present embodiment uses second adaptive control when the judgment unit 106 judges that the processing time Δt is almost half of the cycle of fluctuation, and uses first adaptive control when the judgment unit 106 judges that the processing time Δt is of almost half.

Here, in the first adaptive control, the adaptive processing controller 132 transmits a downlink signal RSdown by the adaptive array control that uses the first array weight calculated by the first weight calculator 103.

Meanwhile, in the second adaptive control, the adaptive processing controller 132 transmits the downlink signal RSdown via the transmitter (e.g., the transmitter 108_1 including the element antenna 101_1) including the element antenna having the lowest electric power value and therefore selected by the antenna selector 131. Note that the adaptive processing controller according to the present embodiment constitutes the transmission controller.

Operation of Radio Base Station According to Fourth Embodiment

The operation of the radio base station 100 according to the present embodiment will be described. Note that, in comparison with the operation of the radio base station 100 according to the first embodiment described above, the radio base station 100 according to the present embodiment differs in the operation of step S17a shown in FIG. 4, and thus the operation of the step S17a will be mainly described with references to step S117a of FIG. 14.

Figure 14:
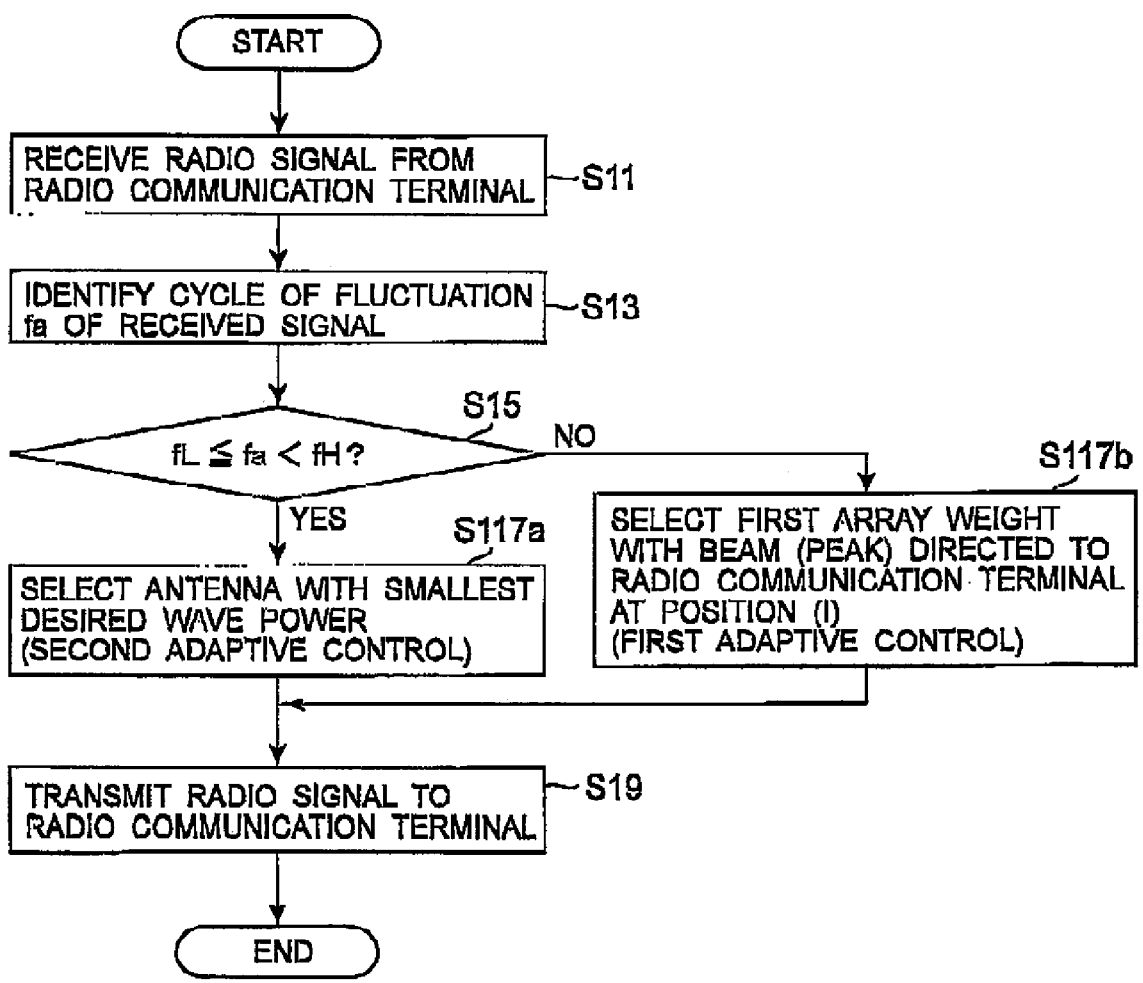
FIG. 14 is an operation flowchart in the radio base station according to the fourth embodiment of the present invention.

In step S117a shown in FIG. 14, in the radio base station 100, when the judgment unit 106 judges that the cycle of fluctuation fa satisfies $fL \leq a < fH$ (when $fL \leq fa < fH$ is YES), the adaptive processing controller 107 not only instructs the antenna selector 131 to notify the adaptive processing controller 107 of the element antenna having the lowest desired wave received power value, but so also performs the second adaptive control to transmit the downlink signal RSdown via the transmitter (e.g., the transmitter 108_1 including the element antenna 101_1) including the element antenna selected by the antenna selector 131.

In addition, in step S117b, when the judgment unit 106 judges that the cycle of fluctuation fa does not satisfy $fL \leq fa < fH$ (when $fL \leq fa < fH$ is NO), the adaptive processing controller 107 instructs the first weight calculator 103 to calculate a first array weight and performs the first adaptive control. Note that the operation of step S117b is similar to that of step S17b in FIG. 4.

Operations and Effects of Radio Base Station According to Fourth Embodiment

The radio base station 100 according to the present embodiment uses the second adaptive control when the judgment unit 106 judges that the processing time Δt is almost half of the cycle of fluctuation fa, and uses the first adaptive control when the judgment unit 106 judges that the processing time Δt is not almost half.

As shown in FIG. 10, in the radio base station 100, influenced by Doppler variation due to movement of the radio communication terminal 200, desired wave power to be received by the receivers fluctuates. When the propagation path state detector 105 detects the fluctuation, and if it is judged that the propagation path fluctuates so that the radio communication terminal 200 moves to a null of a periodic signal at the transmission time t2 of a downlink signal RSdown, transmission by the second adaptive control is performed.

At this time, the larger desired wave power the element antenna has, the better the propagation path between the element antenna and the radio communication terminal 200 is. This enables efficient communications in both transmission and reception.

By contrast, if the propagation path fluctuates in the radio base station 100 so that the radio communication terminal 200 moves to a null (valley) of a periodic signal (standing wave), at the transmission time t2 of the downlink signal RSdown, it is highly likely that magnitude of the desired wave power at the reception time t1 of the uplink signal RSup and an absolute value of the weight at the transmission time t2 of the downlink signal RSdown will be reversed. Therefore, the radio base station 100 transmits the downlink signal RSdown by using the element antenna with the small is desired wave power selected by the antenna selector 131, and thus the radio communication terminal 200 can acquire good communication quality at a position (b) at the t2 of receiving the downlink signal RSdown.

Fifth Embodiment of the Present Invention

A configuration of the radio base station 100 according to a fifth embodiment of the present invention will be described hereinafter, by focusing on difference from the first embodiment described above. In the following, parts different from the radio base station 100 of the first embodiment will be mainly described and description of similar functions will be omitted as appropriate.

Configuration of Base Station 100 According to Fifth Embodiment

Figure 15:
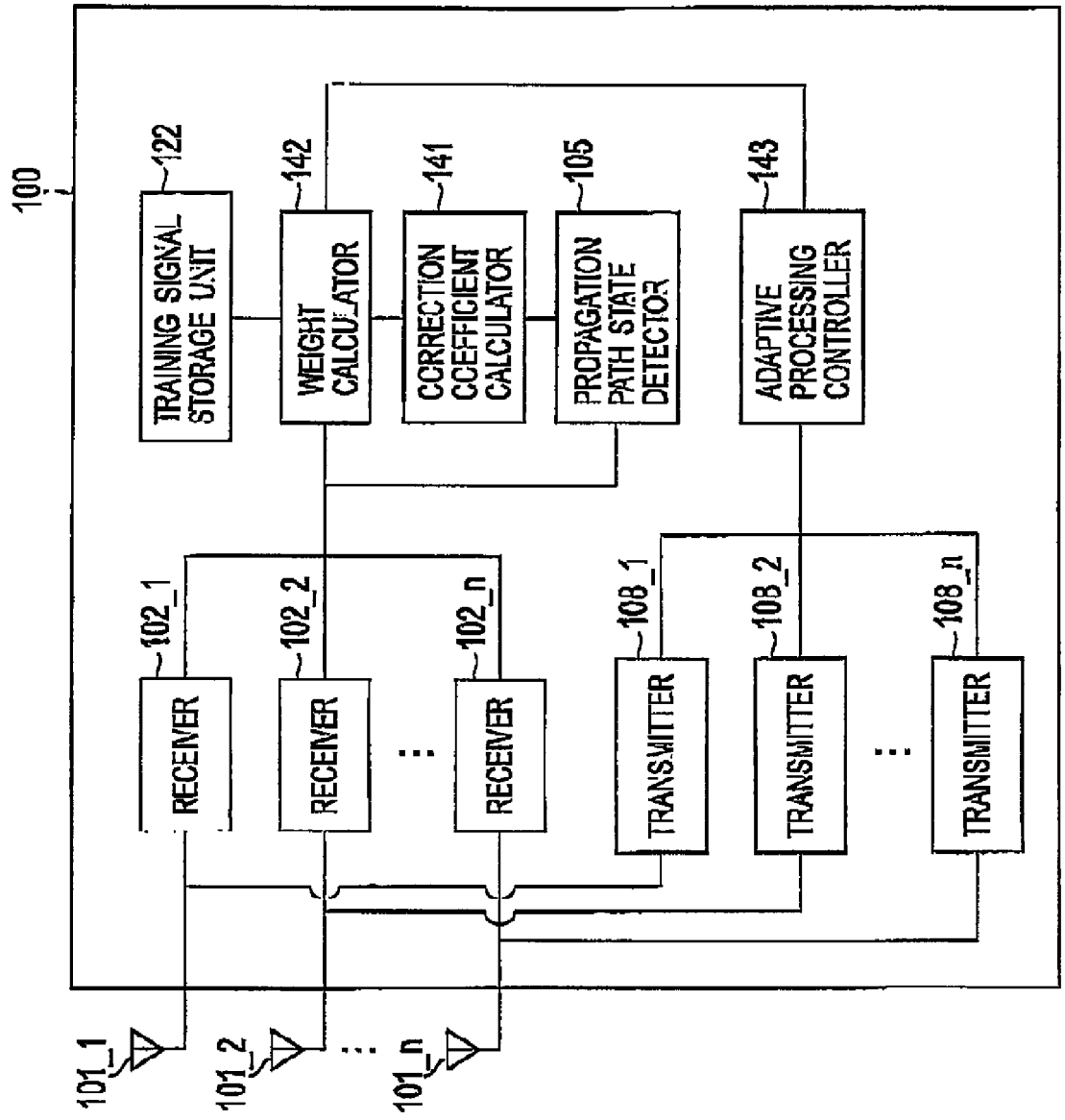
FIG. 15 is a functional block configuration diagram of a radio base station according to a fifth embodiment of the present invention.

As shown in FIG. 15, instead of including the first weight calculator 103, the second weight calculator 104, and the judgment unit 106 provided to the radio base station 100 according to the first embodiment, the radio base station 100 according to the present embodiment newly includes a training signal storage unit 122, a correction coefficient calculator 141, and a weight calculator 142.

A propagation path state detector 105 is connected to the receivers 102_1 to 102_n, the correction coefficient calculator 141, and an active processing controller 143. Similar to the first embodiment, the propagation path state detector 105 detects fluctuation state in the propagation path to the radio communication terminal 200.

The training signal storage unit 122 is connected to the weight calculator 142. In addition, the training signal storage unit 122 is configured similarly to the third embodiment.

The correction coefficient calculator 141 calculates a correction term $\epsilon(t)$ to be used in a calculation formula for calculating a transmission weight of a downlink signal RSdown, on the basis of fluctuation state of the propagation path detected by the propagation path state detector 105. The correction coefficient calculator 141 according to the present embodiment constitutes a correction term calculator.

The weight calculator 142 is connected to the correction coefficient calculator 141 and the adaptive processing controller 143.

The weight calculator 142 calculates a transmission weight to be used by the receivers 102_1 to 102_n and the training signal storage unit 122, and in the adaptive control.

Specifically, the weight calculator 142 calculates a transmission weight W on the basis of the reception signal received by the receivers 102_1 to 102_n, the training signal stored in the training signal storage unit 122, and the correction term $\epsilon(t)$ calculated by the correction coefficient calculator 141.

In addition, the adaptive processing controller 143 applies the transmission weight W to the downlink signal RSdown. The transmission weight W has been corrected by using the correction term $\epsilon(t)$ calculated by the correction coefficient calculator 141. Note that the adaptive processing controller 143 according to the present embodiment constitutes a transmission controller.

Operation of Radio Base Station According to Fifth Embodiment

The operation of the radio base station 100 according to the present embodiment will be described. Note that, in comparison with the operation of the radio base station 100 according to the first embodiment described above, the radio base station 100 according to the present embodiment differs only in the operation of steps S15 to S17a and S17b shown in FIG. 4. Thus, the different operation will be mainly described with reference to FIG. 16.

Figure 16:
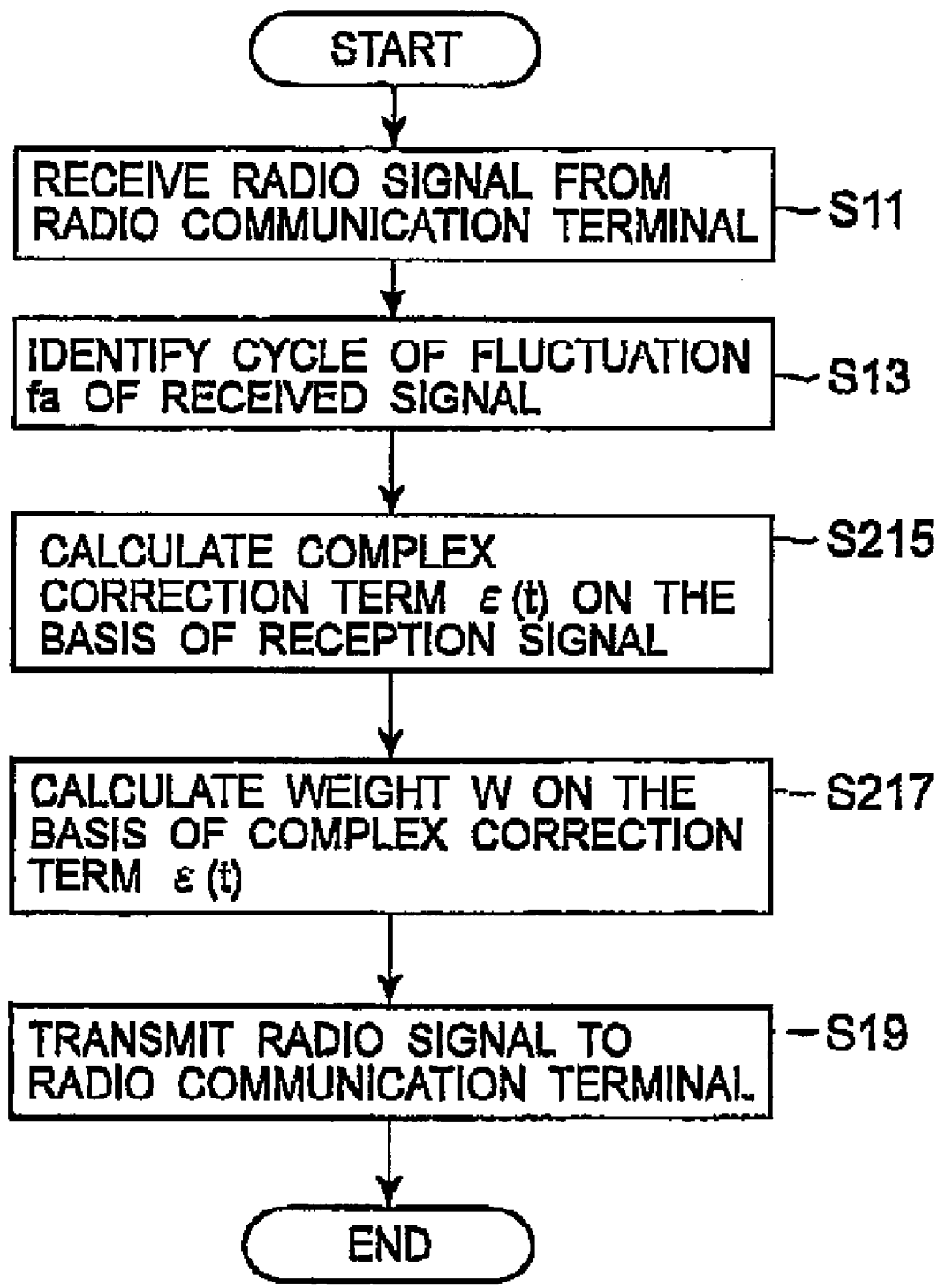
FIG. 16 is an operation flowchart in the radio base station according to the fifth embodiment of the present invention.

In step S215 shown in FIG. 16, based on the cycle of fluctuation fa detected by the propagation path state detector 105 and the training signal, the correction coefficient calculator 141 calculates a (complex correction term) that will be the expression (5) as shown below. However, r(t) represents a series of the training signals.

[Expression 5]

$$0 \leq |e(t)| \leq |r(t)|$$ Expression (5)

In step S217, the weight calculator 142 calculates a transmission weight W so that $E[|e(t)|^2]$ of the expression (6) below will be minimum, wherein $E[|e(t)|^2]$ represents an expectation value computation, H represents complex conjugate transposition, and X(t) represents a series of the reception signals

[Expression 6]

$$E[|e(t)|^2]=E[|r(t)-W^H X(t)-\epsilon(t)|^2]$$ Expression (6)

Here, as a value of the correction term becomes closer to "0," the weight calculator 142 calculates the transmission weight W so that a peak is directed to a position (a) at time t1 when the radio communication terminal 200 transmits an uplink signal RSup.

In addition, the weight calculator 142 may be configured to judge whether or not the correction term ϵ(t) is greater than or equal to a predetermined threshold, and to calculate the transmission weight W with the expression (6) by using the correction term ϵ(t) only if the correction term ϵ(t) is greater than or equal to the predetermined threshold or calculate the transmission weight W as "0" if the correction term ϵ(t) is not greater than or equal to the predetermined threshold.

The weight calculator 142 also notifies the adaptive processing controller 143 of the calculated transmission weight W. In addition, the adaptive processing controller 143 performs the adaptive array control by using the notified transmission weight W, and transmits the downlink signal RSdown to the radio communication terminal 200 (step S19).

Operations and Effects of Radio Base Station According to Fifth Embodiment

With the radio base station 100 according to the present embodiment, a correction term ϵ(t) corresponding to the cycle of fluctuation fa is calculated, and the transmission weight W with the null (or peak) shifted according to the cycle of fluctuation fa to the position (a) at the time t1 when the radio communication terminal 200 transmits the uplink signal RSup is calculated.

Thus, Hence, calculation of the correction term ϵ(t) enables the adaptive array control and transmission of the downlink signal RSdown to the radio communication terminal 200 by use of an appropriate transmission weight W corresponding to the cycle of fluctuation fa with respect to the radio communication terminal 200.

Meanwhile, in the present embodiment, when the correction as term ϵ(t) is "0," the transmission weight W corresponding to the first array weight in the foregoing first embodiment, that is, the transmission weight W with the peak directed to the position (a) at the time t1 when the radio communication terminal 200 transmits the uplink signal RSup is calculated. When the correction term ϵ(t) is a largest value "r(t)," the transmission weight W corresponding to the second array weight in the foregoing first embodiment, that is, the transmission weight W with the null directed to the position (a) at the time t1 when the radio communication terminal 200 transmits the uplink signal RSup is calculated. The adaptive array control to be performed by using the transmission weight W with the peak directed to the position (a) corresponds to the first control method in the first embodiment described above, while the adaptive array control to be performed by using the transmission weight W with the null directed to the so position (a) corresponds to the second control method.

Thus, in the present embodiment, by determining on whether the correction term ϵ(t) is "0" or a value greater than "0" on the basis of the cycle of fluctuation fa and the training signal, the transmission weight corresponding to the first array weight in the above first embodiment as a result, or the transmission weight that is different from the first array weight is calculated.

Thus, in the present embodiment, although the judgment unit 106 is not provided, it is determined based on the correction term ϵ(t) whether the transmission weight W corresponding to the first array weight in the foregoing first embodiment can be used or a transmission weight W different from the first array weight is calculated. Consequently, this corresponds to judging whether or not to change directivity of a transmission radio signal on the basis of fluctuation state of the propagation path detected by the propagation path state detector 105.

Sixth Embodiment of the Present Invention

A configuration of a radio base station 100 according to a sixth embodiment of the present invention will be described hereinafter, by focusing on differences from the first embodiment described above. In the following, parts different from the radio base station 100 of the first embodiment will be mainly described and description of similar functions will be omitted as appropriate.

Configuration of Base Station 100 According to Sixth Embodiment

The radio base station 100 according to the present embodiment uses multiple frequency bands to transmit an uplink signal RSup to and receive a downlink signal RSdown and from a radio communication terminal 200.

Figure 17:
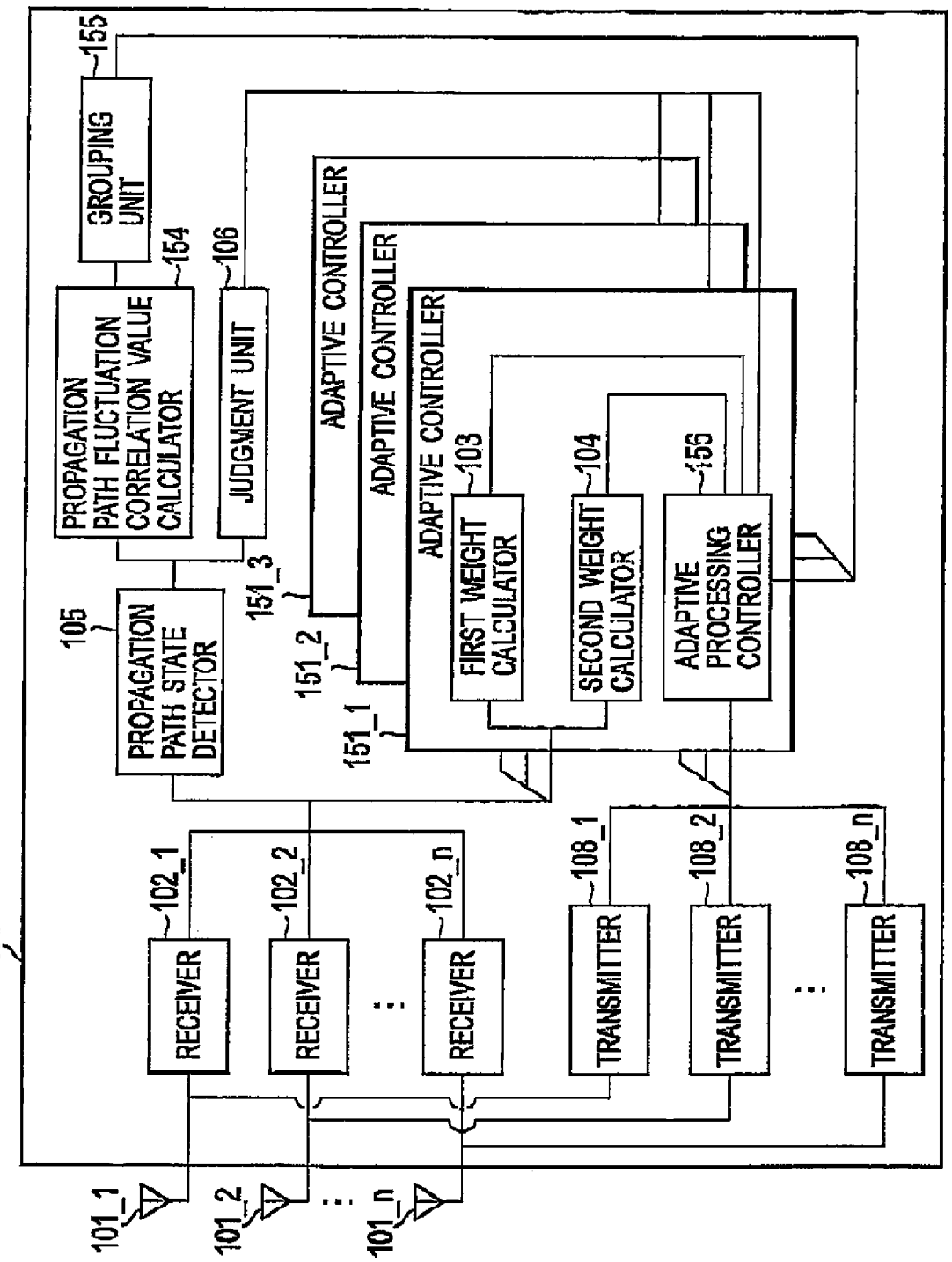
FIG. 17 is a functional block configuration diagram of a radio base station according to a sixth embodiment of the present invention.

As shown in FIG. 17, the radio base station 100 according to the present embodiment includes element antennas 101_1 to 101_n, receivers 102_1 to 102_n, a propagation path state detector 105, a judgment unit 106, transmitters 108_1 to 108n, adaptive controllers 151_1 to 151_3, a propagation path fluctuation correlation value calculator 154, and a grouping unit 155. Note that, although the case of the radio base station 100 according to the present embodiment that includes three adaptive controllers 151_1 to 151_3 will be described as an example, the number of the adaptive controllers shall not be limited to this.

Herein, configurations of the element antennas 101_1 to 101_n, the receivers 102_1 to 102_n, the propagation path state detector 105, the judgment unit 106, the transmitters 108_1 to 108_n are similar to the first embodiment described above.

The propagation path fluctuation correlation value calculator 154 is connected to the propagation path state detector 105 and the grouping unit 155. The propagation path fluctuation correlation value calculator 154 correlates and calculates fluctuation of each propagation path of the multiple frequency bands and calculates each correlation value. The propagation path fluctuation correlation value calculator 154 also notifies the grouping unit 155 of the calculated correlation value.

The propagation path fluctuation correlation value calculator 154 according to the present embodiment constitutes a frequency band correlation detector which detects a degree of correlation of each of the frequency hands.

The grouping unit 155 is connected to the propagation path fluctuation correlation value calculator 154 and the adaptive controllers 151_1 to 151_3.

The grouping unit 155 groups the adaptive controllers 151_1 to 151_3 on the correlation value calculated by the propagation path fluctuation correlation value calculator 154.

The grouping units 155 groups the adaptive controllers so that the adaptive controllers 151_1 to 151_3 of frequency bands whose correlation values calculated by the propagation path fluctuation correlation value calculator 154 are greater than a predetermined threshold that has been stored in advance are in a same group, and notifies the adaptive controllers 151_1 to 151_3 that have been grouped into the same group of the grouping.

The adaptive controllers 151_1 to 151_3 are connected to the receivers 102_1 to 102_n, the judgment unit 106, the grouping unit 155, and the transmitters 108_1 to 108_n.

The adaptive controllers 151_1 to 151_3 are configured to perform the adaptive array control for each of different frequency bands in the downlink signal RSdown.

In addition, in the adaptive controllers 151_1 to 151_3 that have been notified that they belong to the some group, only one in the group is used to calculate a first array weight or a second array weight, the calculation result is shared in the group, and the adaptive controller 156 of each of the adaptive controllers 151_1 to 151_3 performs the adaptive array control.

Here, a configuration of the adaptive controller 151_1 will be described, since each of the adaptive controllers 151_1 to 151_3 is similarly configured.

The adaptive controller 151_1 includes the first weight calculator 103, the second weight calculator, and the adaptive processing controller 156.

The configurations of the first weight calculator 103 and the second weight calculator 104 are similar to the first embodiment described above.

Upon receipt of a notice from the grouping unit 155 that the adaptive controller 151_1 belongs to the same group as the other adaptive controllers 151_2 to 151_3, the adaptive processing controller 156 shares the calculated first or second array weight with the adaptive controllers 151_2 to 151_3 belonging to the same group, and performs the adaptive array control.

Operation of Radio Base Station According to Sixth Embodiment

Figure 18:
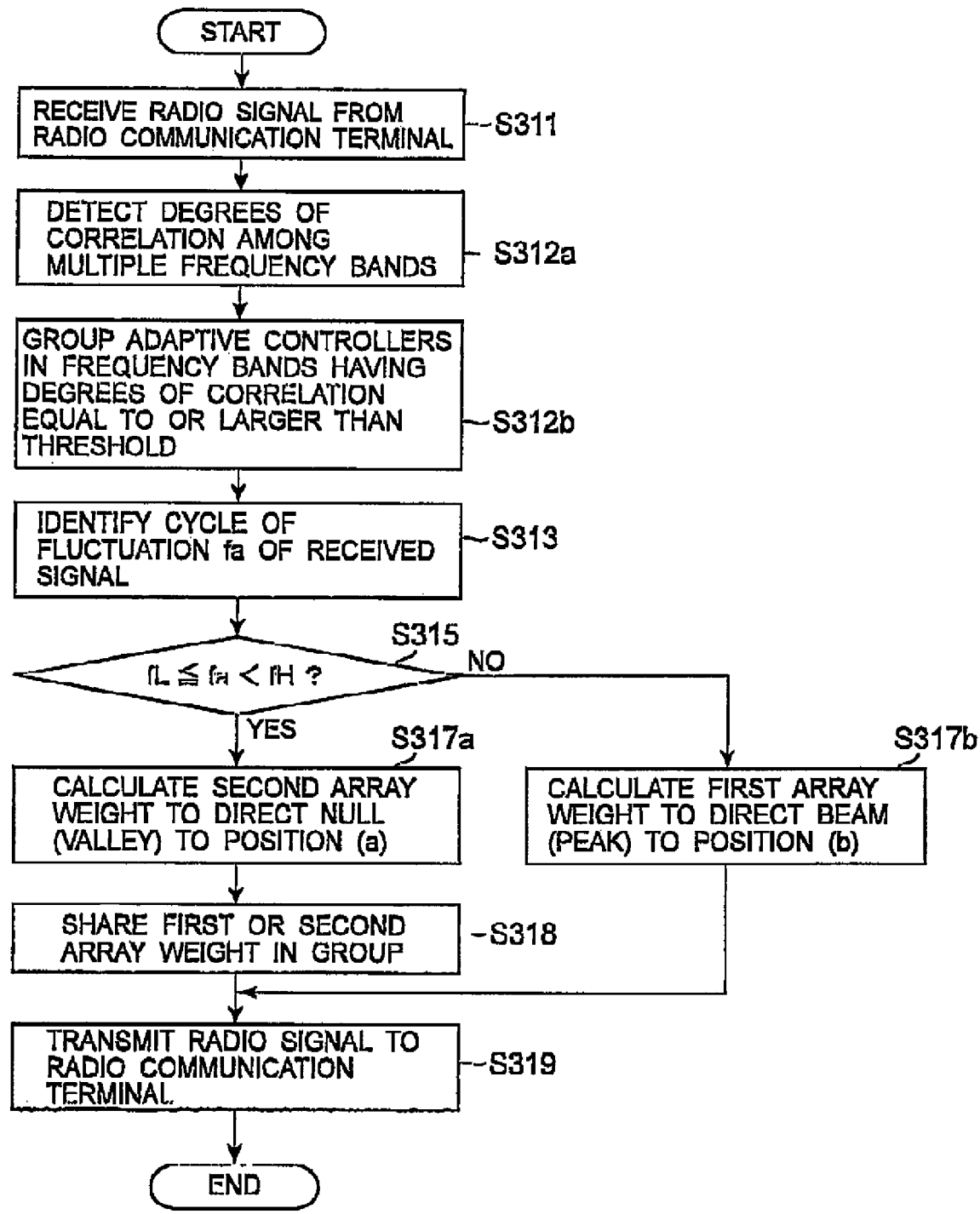
FIG. 18 is an operation flowchart in the radio base station according to the sixth embodiment of the present invention.

The operation of the radio base station 100 according to the present embodiment will be described with reference to FIG. 18 by focusing on differences from the first embodiment described above.

In step S311, the radio base station 100 receives an uplink signal RSup from the radio communication terminal 200.

In step S312a, the propagation path fluctuation correlation value calculator 154 correlates and calculates fluctuations of each propagation path of the multiple frequency bands, calculates each correlation value, and notifies the grouping unit 155 of the correlation values.

In step S312b, the grouping unit 155 groups the adaptive controllers 151_1 to 151_3 corresponding to the frequency bands whose correlation values are greater than a predetermined threshold. The grouping unit 155 notifies the adaptive controllers 151_1 to 151_3 belonging to a same group that the adaptive controllers 151_1 to 151_3 belong to the same group. At this time, the grouping unit 155 identifies one adaptive controller (the adaptive controller 151_1, for example) to calculate a first or a second array weight, and issues an instruction to the identified adaptive controller.

Upon receipt of the instruction to calculate the first or the second array weight from the grouping unit 155, the adaptive controller 151_1, for example, performs the operation of steps S313 and S315, and S317d to S317b. Note that the operation of the steps S313 and S315, and S317a to S317b is similar to the operation of stops S13 and S15, and S17a to S17b according to the first embodiment.

In step S318, in the adaptive controller 151_1, for example, that has received the notice from the grouping unit 155, the adaptive processing controller 156 notifies the adaptive controllers 151_2 to 151_3 in the same group of the first or the second array weight.

In step S319, each adaptive processing controller of the adaptive controllers 151_1 to 151_3 uses the notified first array weight or second array weight and transmits downlink signals RSdown from the transmitters 108_1 to 108_n.

As described above, the adaptive processing controllers provided to each of the adaptive controllers 151_1 to 151_3 according to the present embodiment are grouped for multiple frequency bands whose degree of correlation detected by the propagation path fluctuation correlation value calculator 154 is greater than or equal to a predetermined threshold, and transmits downlink signal. RSdown by us of the same second array weight with the null directed to the position (a) where the radio communication terminal 200 is located at the reception time t1 of the uplink signal RSup or the same first array weight with the peak directed to the position (a).

Note that the adaptive processing controllers according to the present embodiment constitutes a transmission controller.

Operations and Effects oat Radio Base Station According to Sixth Embodiment

With the radio base station 100 according to the present embodiment, the adaptive controllers 151_1 to 151_3 correlation values of multiple frequency bands correspond to high frequency bands greater than or equal to a predetermined threshold are grouped, share one first or second array weight in the same group, and transmit downlink signals RSdown to the radio communication terminal 200. Accordingly, an increase of load of computation processing can be reduced in comparison with the case in which the adaptive controllers 151_1 to 151_3 for each of the multiple frequency bands calculate a first or a second array weight.

Other Embodiments

As described above, content of the present invention has been disclosed through the first to the sixth embodiments of the present invention. However, it should not be construed that the description and drawings constituting a part of this disclosure will limit the present invention. Various alternative embodiments will be apparent to those skilled in the art from this disclosure.

For example, in the present embodiments as described above, the radio base station 100 is configured to servo as a radio communication device. However, for example, the radio communication terminal 200 may be configured to serve as a radio so communication device. In addition, the radio base station 100 may also be configured to serve as a counterpart radio communication device.

In addition, when the radio communication terminal 200 is equipped with a position detection function such as a GPS, a traveling speed detection function, or the like, the radio base station 100 may be configured to select a first array weight for directing a peak (beam) or a second array weight for directing a null depending on a position or a traveling speed detected by the radio communication terminal 200.

It is also possible to combine each of configurations of embodiments and configurations of modifications. In addition, the operations and effects of each embodiment and each modification simply list the most preferable operations and effects of the present invention. Thus, the operations and effects of the present invention shall not be limited to the description of each of the embodiments and the modifications.

As described above, it is needless to say that the present invention contains various embodiments that have not been described herein. Thus, a technical scope of the present invention shall be defined only by inventive specific matters according to the scope of claims that are reasonable from the above description.

Seventh Embodiment of the Present Invention

A seventh embodiment and an eight embodiment of the present invention will be described hereinafter. In the seventh embodiment and the eighth embodiment, Space Diversity Multiple Access (SDMA) scheme is used between a radio base station and multiple radio communication terminals. In the case where SDMA is used, the following should be considered, in particular.

That is, in the case of communications by Space Diversity Multiple Access (SDMA) scheme, when a radio base station transmits a radio signal to a first radio communication terminal, and when a second radio communication terminal connected to the first radio communication terminal by the space diversity multiple access travels at high speed (100 km/h or higher), the second radio communication terminal receives the signal transmitted to the first radio communication terminal and accordingly is affected by interference. In such a condition, degradation of the communication quality at the second radio communication terminal matters more than the aforementioned problem of degradation of the communication quality of received radio signal at the radio communication terminal (the first radio communication terminal).

Hence, it communications using SDMA are performed between the radio base station and the multiple radio communication terminals fL is an object to provide a radio communication device and a radio communication method capable of suppressing degradation of the communication quality of the second radio communication terminal connected by the space diversity multiple access as well as the first radio communication terminal when the radio base station transmits a radio signal to the first radio communication terminal.

Figure 19:
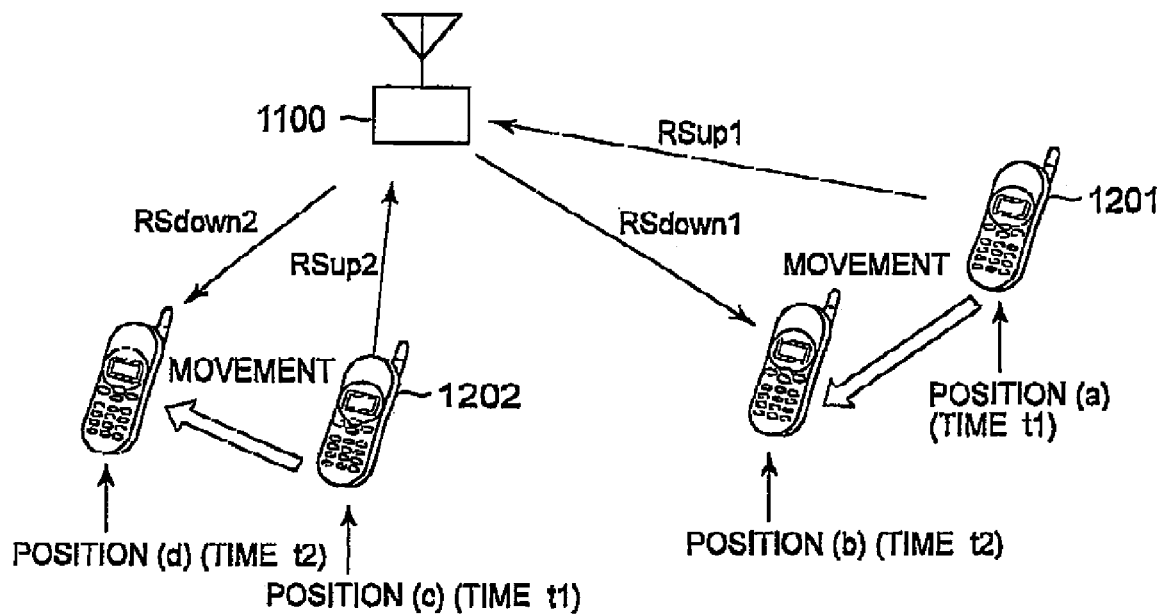
FIG. 19 is an overall schematic configuration diagram of a mobile communication system according to a seventh embodiment of the present invention.

Overall Schematic Configuration of Mobile Communication System According to Seventh Embodiment FIG. 19 is an overall schematic configuration diagram of a mobile communication system including a radio communication device according to the present embodiment. The mobile communication system includes a radio base station 1100 (radio communication device), a radio communication terminal 1201 (fifth counterpart radio communication device), and a radio communication terminal 1202 (second counterpart radio communication device). Note that the number of the radio base station and the radio communication terminals forming the mobile communication system shall not be limited to the number shown in FIG. 19.

In the mobile communication system, radio communications are performed between the radio base station 1100 and the radio communication terminals 1201 to 1202. The mobile communication system-m uses Space Division Multiple Access (SDMA) as well as Time Division Multiple Access/ Time Division Duplex (TDMA/TDD).

The radio base station 1100 performs adaptive array control by using multiple element antennas. Specifically, the radio base station 1100 adaptively controls directivity of a downlink signal RSdown1 (transmission radio signal) to be transmitted to the radio communication terminal 1201, on the basis of an uplink signal RSup1 (first received radio signal) received from the radio communication terminal 1201 which is a communication target radio communication device. Also in communications with the radio communication terminal 1202, the radio base station 1100 adaptively controls directivity of a downlink signal RSdown2 (transmission radio signal) to be transmitted to the radio communication terminal 1202, on the basis of the received uplink signal RSup1 (second received radio signal).

The radio communication terminals 1201 to 1202 are mobile phone terminals having functions of transmitting and receiving voice communication or emails. In addition, mobile devices such as a mobile phone, a PDA (Personal Digital Assistant), and a notebook calculator are assumed for the radio communication terminals 1201 to 1202.

In addition, FIG. 19 shows an image of the radio communication terminal 1201 transmitting an uplink signal RSup1 at a position (a) at time t1 and receiving a downlink signal RSdown2 after moving to a position (b) at time t2, and of the radio communication terminal 1202 transmitting an uplink signal RSup2 at a position (c) at the time t1 and receiving the downlink signal RSdown2 after moving to a position (d) at the time t2.

Figure 20:
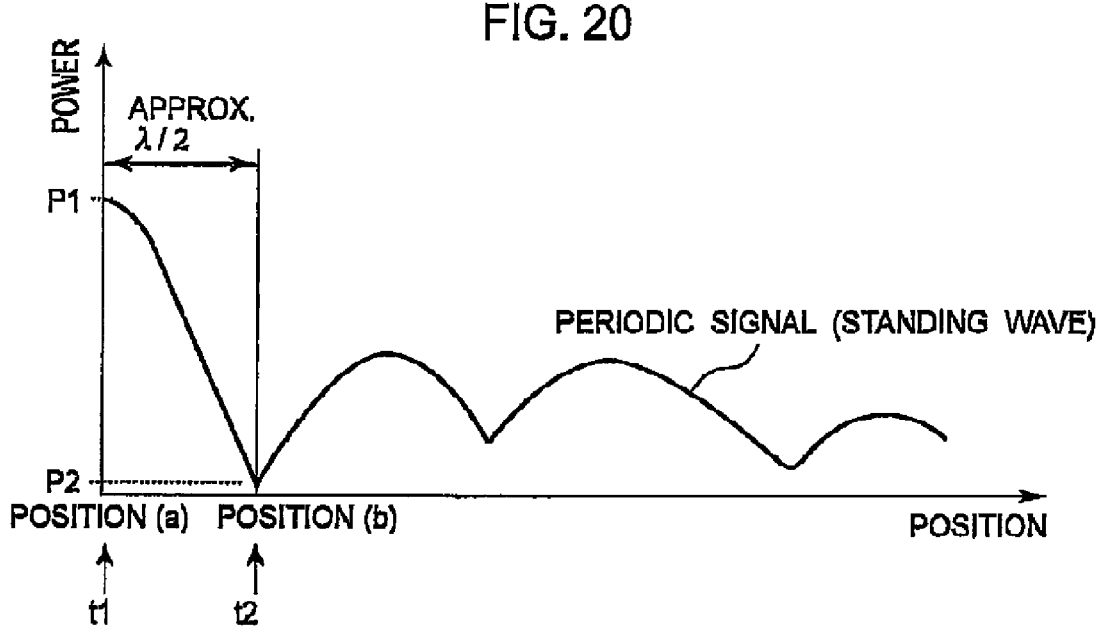
FIG. 20 is a chart showing a periodic signal (standing wave) around a radio communication terminal according to the seventh embodiment of the present invention.

Here, for the radio communication terminals 1201 to 1202, propagation paths fluctuate due to a change in the surroundings such as movement of the devices themselves or movement or the like of an object in the neighborhood. Then, the radio signal transmitted from the radio base station 1100 causes a periodic signal periodically having peaks of electric power values such as a standing wave to appear around the radio communication terminal 1201, for example, as shown in FIG. 20.

A distance in such periodic signal from received power P1 of a peak to received power P2 of a null, i.e., a wavelength of the periodic signal is approximately 7.5 cm on the assumption that the wavelength of the periodic signal is almost half when the frequency of the radio signal is in a 2 GHz band, for example.

Here, even when the conventional radio base station 1100, for example, adaptively controls directivity to the position (a) on the basis of the uplink signal RSup1 received at the time t1 from the radio communication terminal 1201, the radio communication terminal 1201 moves to the position (b) where the received power P2 is null. As a result, the communication quality may be degraded. The radio base station 1100 configured to solve such a problem will be described hereinafter.

Configuration of Radio Base Station According to Seventh Embodiment

Figure 21:
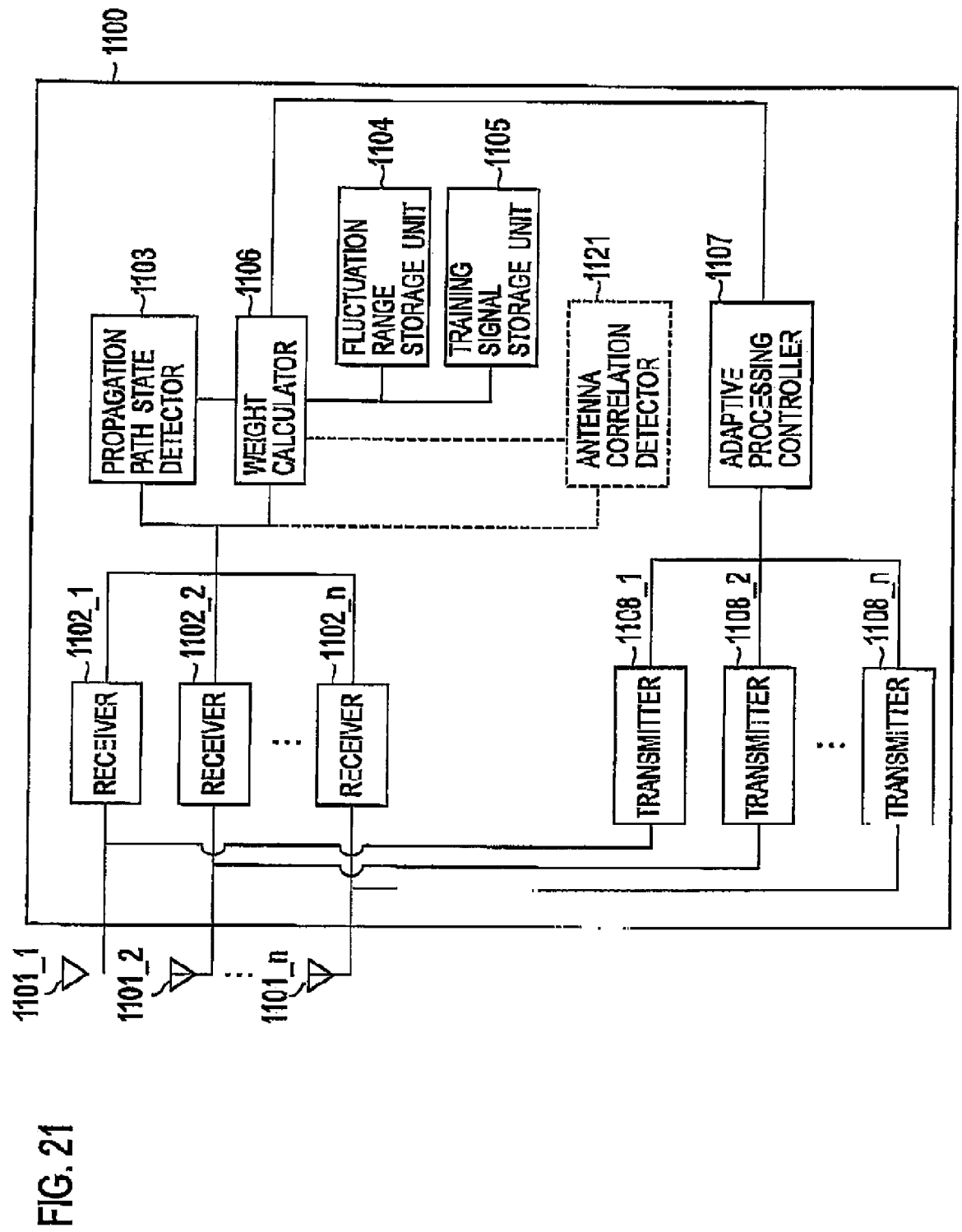
FIG. 21 is a functional block configuration diagram of a radio base station according to the seventh embodiment of the present invention.

FIG. 21 is a functional block configuration diagram of the radio base station 1100 according to the present embodiment. In addition, parts relevant to the present invention will be mainly described hereinafter. Thus, it should be noted that the radio base station 1100 may include a logical block (such as a power supply unit) that is essential in implementing functions as, the radio base station 1100 but that are not shown or description of which is omitted.

As shown in FIG. 21, the radio base station 1100 includes element antennas 1101_1 to 1101_n, receivers 1102_1 to 1102_n, a propagation path state detector 1103, a fluctuation range storage unit 1104, a training signal storage unit 1105, a weight calculator 1106, an adaptive processing controller 1107, and transmitters 1108_1 to 1108_n.

The element antennas 1101_1 to 1101_n are connected to the receivers 1102_1 to 1102_n and the transmitters 1108_1 to 1108_n, and transmits and receives radio signals to and from the radio communication terminals 1201 to 1202 according to TDMA/TDD and SDMA.

The receivers 1102_1 to 1102_2 receive the uplink signals RSup1 to 2 from the radio communication terminals 1201 to 1202 via the element antennas 1101_1 to 1101_n.

The propagation path state dtoctor 1103 is connected to the receivers 1102_1 to 1102_n and the weight calculator 1106. The propagation path state detector 1103 detects a first fluctuation state that is a fluctuation state of the propagation path to the radio communication terminal 1201, on the basis of the uplink signal RSup1 received from the radio communication terminal 1201. Specifically, the propagation path state detector 1103 identifies a first cycle of fluctuation $f_A$ (first fluctuation state) of the propagation path to the radio communication terminal 1201, on the basis of the uplink signal RSup1. At this time, the propagation path state detector 1103 identifies the cycle of fluctuation or an electric power value of the uplink signal RSup as the first cycle fluctuation $f_A$.

The propagation path state detector 1103 detects a second fluctuation state that is a fluctuation state of a propagation path to the radio communication terminal 1202, on the basis of the uplink signal RSup2 received from the radio communication terminal 1202. Specifically, based on the uplink signal RSup2, the propagation path state detector 1103 identifies a second cycle of fluctuation $f_n$ (second fluctuation state) in which the state of the propagation so path to the radio communication terminal 1202 fluctuates. At this time, the propagation path state detector 1103 identifies the cycle of fluctuation of an electric power value of the uplink signal RSup2 as the second cycle of fluctuation $f_B$. The propagation path state detector 1103 also notifies the weight calculator 1106 of the identified cycles of fluctuation $f_A$ to $f_B$. In the present embodiment, the propagation path state detector 1103 constitute a first propagation path state detector and a second propagation path state detector.

The fluctuation range storage unit 1104 stores a certain range of the cycle of fluctuation of an arbitrary received power values. Specifically, the fluctuation range storage unit 1104 stores a lower limit value fL and an upper limit value fH of the cycle of fluctuation that represents almost half of the range of the cycle of fluctuation $f_A$ corresponding to processing time Δt from time of receiving the uplink signals RSup1 to 2 from the radio communication terminals 1201 to 1202 to time of transmitting the downlink signals RSdown 1 to 2.

The training signal storage unit 1105 is connected to the weight calculator 1106. The training signal storage unit 1105 stores training signals used in radio communications with the radio communication terminals 1201 to 1202. Herein, the training signals represent known signals having known amplitude and phase values.

The weight calculator 1106 is connected to the receivers 1102_1 to 1102_n, the fluctuation range storage unit 1104, the training signal storage unit 1105, and the adaptive controllers 1107. The weight calculator 1106 also calculates a weight to be used in adaptive array control in transmitting downlink signals RSdown 1 to 2.

In addition, the weight calculator 1106 determines whether or not to change directivity of the downlink signal RSdown1 to be transmitted to, for example, the targeted radio communication terminal 1201 on the basis of the fluctuation state detected by the propagation path state detector 1103. Specifically, the weight calculator 1106 determines whether or not to change the directivity of the downlink signal RSdown1 to be transmitted to the radio communication terminal 1201, on the basis of the first cycle of fluctuation $f_A$ and the second cycle of fluctuation $f_B$.

In addition, when a target to transmit the downlink signal is, for example, the radio communication terminal 1201, the weight calculator 1106 not only compares the first cycle of fluctuation fA identified by the propagation path state detector 1103 with the processing time Δt from the time of receiving the uplink signal RSup1 from the radio communication terminal 1201 to the time of transmitting the downlink signal RSdown1, but also compares the second cycle of fluctuation fB identified by the propagation path state detector 1103 with the processing time Δt from the time of receiving the uplink signal RSup2 from the radio communication terminal 1202 to the time of transmitting the downlink signal RSdown2. Then, the weight calculator 1106 calculates a weight to be used in transmission of the downlink signal RSdown1 to the radio communication terminal 1201. At this time, the weight calculator 1106 determines that the processing time Δt falls within a predetermined range corresponding to the first cycle of fluctuation fA and whether or not the pressing time Δt falls within a predetermined range corresponding to the second cycle of fluctuation fB, and calculates a weight. Then, the predetermined range described above means the range from the lower limit value fL to the upper limit value FH of the range of the cycle of fluctuation stored in the fluctuation range storage unit 1104.

Specifically, the weight calculator 1106 calculates a weight W so that $E[|e(t)|^2]$ will be smallest, by using, for example, the following expressions (1) to (4), and on the basis of: the uplink signals RSup1 to 2 from the radio communication terminal 1201 and the radio communication terminal 1102; the first cycle of fluctuation $f_A$ to the second cycle of fluctuation $f_B$ of the uplink signal RSup1 to 2; and the lower limit fL and the upper limit fH of the fluctuation range.

Note that, in the following expressions (1) to (4), $E[|e(t)|^2|]$ represents computation of an expectation value, r(t) represents a training signal (subscripts A and B represent training signals to be used in communications with the radio communication to terminal 1201 and the radio communication terminal 1202, respectively), H represents complex conjugate transposition, and X(t) represents a series of the reception signals. In addition, fL and fH represent the lower limit value and the upper limit value in the range of the cycle of fluctuation stored in the fluctuation range storage unit 1104, and $f_A$ and $f_B$ respectively represent the first cycle of fluctuation and the second cycle of fluctuation of desired waves from the radio communication terminal 1201 and the radio communication terminal 1201. In addition, the following example shows a case of calculating a weight for the radio communication terminal 1201.

For example, when the first cycle of fluctuation $f_A$ to the second cycle of fluctuation $f_B$ satisfy both $fL \leq f_A < fH$ and $fL \leq f_B < fH$, the weight calculator calculates a weight using the expression (1) as shown below.

[Expression 7]

$$E[|e(t)|^2] = E[|r_A(t) - W^H X(t)|^2] \quad \text{Expression (1)}$$

Note that, with the above expression (1), the weight calculator 1106 calculates a weight of the downlink signal RSdown1 for the radio communication terminal 1201 with a null directed to the radio communication terminal 1201 and with a beam directed to the radio communication terminal 1202 at the reception time t1 of the uplink signals RSup1 to 2. Meanwhile, when $fL > f_A < fH$, and $fL > f_B$ or $f_B \geq fH$, the weight calculator 1106 calculates the weight by using the expression (2) as shown below.

[Expression 8]

$$E[|e(t)|^2] = E[W^H X(t)] \quad \text{Expression (2)}$$

Note that, with the above expression (2), the weight calculator 1106 calculates a weight of the downlink signal RSdown1 for the radio communication terminal 1201 with the null directed to the radio communication terminal 1201 and with the null directed to the radio communication terminal 1202 at the reception time t1 of the uplink signals RSup1 to 2. Meanwhile, when $fL > f_A$ or $f_A \geq fH$, and $fL \leq f_B < fH$, the weight calculator 1106 calculates the weight by using the expression (3) as shown below,

[Expression 9]

$$E[|e(t)|^2] = E[|r_A(t) - W^H X(t)|^2 \times |r_B(t) - W^H X(t)|^2] \quad \text{Expression (3)}$$

Note that, with the above expression (3), the weight calculator 1106 calculates a weight of the downlink signal RSdown1 for the radio communication terminal 1201 with the beam directed to the radio communication terminal 1201 and with the beam directed to the radio communication terminal 1202 at the reception time t1 of the uplink signals RSup1 to 2. Meanwhile, when $fL > f_A$ or $f_A \leq fH$, and $fL > f_B$ or $f_B \geq fH$, the weight calculator 1106 calculates the weight by using the expression (4) as shown below.

[Expression 10]

$$E[|e(t)|^2] = E[|r_A(t) - W^H X(t)|^2] \quad \text{Expression (4)}$$

Note that, with the above expression (4), the weight calculator 1106 calculates a weight of the downlink signal RSdown1 for the radio communication terminal 1201 with the beam directed to the radio communication terminal 1201 and with the null directed to the radio communication terminal 1202 at the reception time t1 of the uplink signals RSup1 to 2. In this way, the weigh calculator 1106 calculates the weight for the downlink signal RSdown1 for the radio communication terminal 1201, depending or the sizes of the respective first cycle of fluctuation $f_A$ to the second cycle of fluctuation $f_B$. Note that the weight calculation is similarly performed when a weight for the downlink signal RSdown2 for the radio communication terminal 1202 is calculated. In the present embodiment, the weight calculator 1106 constitutes a judgment unit.

The adaptive processing controller 1107 is connected to the weight calculator 1106 and the transmitters 1108 1 to 1108_n.

The adaptive processing control 1107 performs the adaptive array control, using the weight calculated by the weight calculator 1106, and transmits the downlink signals RSdown1 to 2 to the radio communication terminals 1201 to 2 via the transmitters 1108_1 to 1108_n.

For example, when transmitting the downlink signal RSdown1 to the radio communication terminal 1201, and when the weight calculator 1106 judges that the adaptive processing controller 1107 transmits the downlink signal RSdown1 with a null directed to the radio communication terminal 1201, the adaptive processing controller 1107 transmits the downlink signal RSdown1 with the null directed to the position (a) of the radio communication terminal 1201 at the reception time t1 of the uplink signal RSup1. Specifically, when transmitting the downlink signal RSdown1 to the radio communication terminal 1201, the adaptive processing controller 1107 transmits the downlink signal RSdown1 with the null directed to the position (a) of the radio communication terminal 1201 at the reception time of the uplink signal RSup1, by using the weight calculated by the weight calculator 1106 and on the basis of the comparison result of the processing time at and the first cycle of fluctuation $f_A$ by the weight calculator 106 as described above, and the comparison result of the processing time Δt and the second cycle of fluctuation ff. In the present embodiment, the adaptive processing controller 1107 constitutes a transmission controller.

The transmitters 1108_1 to 1108_n perform the adaptive array processing in accordance with control of the adaptive processing controller 1107, and transmit the downlink signals RSdown 1 to 2 to the respective radio communication terminals 1201 to 2 via the element antennas 1101_a to 1101_n.

Operation of Radio Base Station According to Seventh Embodiment

Figure 22:
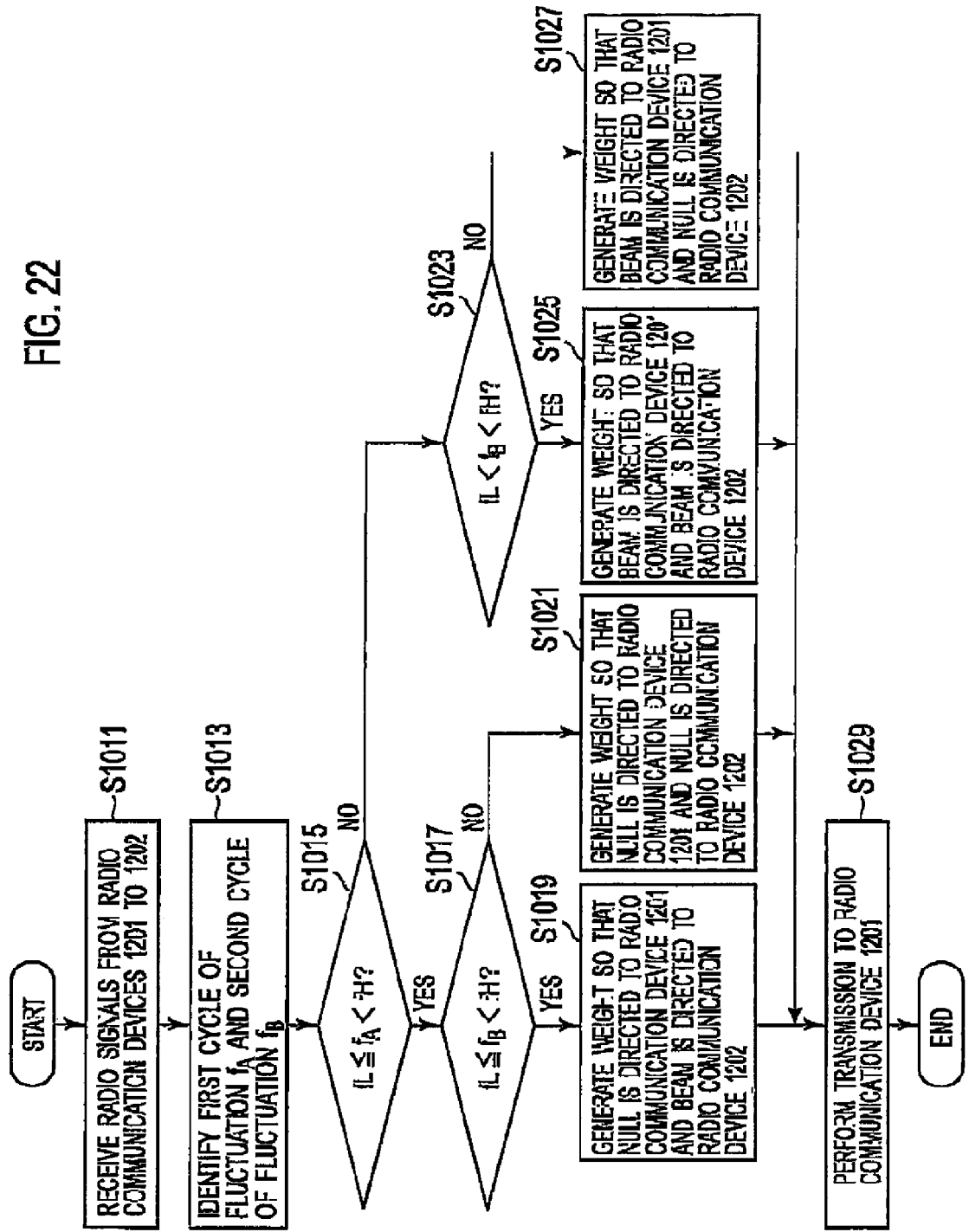
FIG. 22 is an operation flowchart in the radio base station according to the seventh embodiment of the present invention.

The operation of the aforementioned radio base station 1100 will be described hereinafter with reference to FIG. 22. Specifically, the operation at the time when the radio base station 1100 calculates weights of the downlink signals RSdown1 to 2. Note that, the operation to be described hereinafter is the operation at the time when the radio base station 1100 calculates a weight to be used in the downlink signal RSdown1 to the radio communication terminal 1201.

In step S1011, in the radio base station 1100, the receivers 1102_1 to 1102_n receive uplink signals RSup1 to 2 from the radio communication terminal 1201 to 1202.

in step S1013, the propagation path state detector 1103 calculates the first cycle of fluctuation $f_A$ of a desired wave from the radio communication terminal 1201 and the second cycle of fluctuation $f_B$ of a desired wave from the radio communication terminal 1201.

In step s1015, the weight calculator 1106 judges whether or not the first cycle of fluctuation fA satisfies the lower limit value $fL \leq f_A \leq$ the upper limit value fH.

In stop S1017, (when $fL \leq f_A < fH$), the weight calculator 1106 judges whether or not the second cycle of fluctuation fB satisfies the lower limit value $fL \leq f_B <$ the upper limit value fH.

In step S1019, (when $fL \leq f_A$ and $fL \leq f_B < fH$), the weight calculator 1106 uses the expression (1) above, and calculates a weight W so that the null is directed to the radio communication terminal 1201 and the beam is directed to the radio communication terminal 1202.

In step S1021, (when $fL < f_A < fH$, and $fL > f_B$ or $f_B \geq fH$), the weight calculator 1106 uses the expression (2) above, and calculates the weight W so that the null is directed to the radio communication terminal 1201 and the beam is detected to the radio communication terminal 1202.

In step S1023, (when not $fL \leq f_A < fH$), the weight calculator 1106 judges whether or not the second cycle of fluctuation $f_B$ satisfies the lower limit value $fL \leq f_B <$ the upper limit value fH.

In step S1025, (when fL>$f_A$ or $f_A$≦fH, and fL≦$f_B$<fH), the weight calculator 1106 calculates a weight W so that the beam is directed to the radio communication terminal 1201 and the radio communication terminal 1202.

In step S1027, (when fL>$f_A$ or $f_A$≦fH, and fL>$f_B$ or $f_B$≧fH), the weight calculator 1106 calculates the weight W so that the beam is directed to the radio communication terminal 1201 and the null is directed to the radio communication terminal 1202.

In step S1029, the adaptive processing controller 1107 performs the adaptive array control by using the weight W calculated by the weight calculator 1106, and transmits the downlink signal RSdown1 to the radio communication terminal 1201 via the transmitters 1108_1 to 1108_n.

In this way, in a case where the weight calculator 1106 judges that the processing time Δt falls within the predetermined range corresponding to the first cycle of fluctuation $f_A$ and that the processing time Δt falls within the predetermined range corresponding to the second cycle of fluctuation $f_A$ (step S1019 described above), when transmitting the downlink signal RSdown1 to the radio communication terminal 1201, the adaptive processing controller 1107 not only transmits the downlink signal RSdown1 by using the weight by which the null is directed to the position (a) of the radio communication terminal 1201 at the reception time of the uplink signal RSup1, but also transmits the downlink signal RSdown1 by using the weight by which the beam is directed to the radio communication terminal 1202.

In addition, in a case where the weight calculator 1106 judges that the processing time falls within the predetermined range corresponding to the first cycle of fluctuation $f_A$ and the processing time does not fall within the predetermined range corresponding to the second cycle of fluctuation $f_B$ (step S1021 described above), when transmitting the downlink signal RSdown1 to the radio communication terminal 1201, the adaptive processing controller 1107 not only transmits the downlink signal RSdown1 with the null directed to the position (a) of the radio communication terminal 1201 at the reception time t1 of the uplink signal RSup1, but also transmits the downlink signal RSdown1 with the null directed to the radio communication terminal 1202. Note that, the operation in steps S1011 to S1023 described above is also performed on the radio communication terminal 1202.

Operations and Effects of Radio Base Station According to Seventh Embodiment

If it is judged that the processing time Δt is almost half of the cycle of fluctuation $f_A$ of the uplink signals RSup1 to 2 transmitted from the radio communication terminal 1201 to 2, that is, if it is expected that fluctuation in the propagation paths causes reception of downlink signals RSdown1 to 2 with received power P2 of null when the radio communication terminals 1201 to 2 receive the downlink signals RSdown1 to 2, the radio base station 1100 according to the present embodiment as described above performs the adaptive array control on the downlink signal RSdown1 to be transmitted to, for example, the radio communication terminal 1201, by using the weight W calculated so that the null is directed to the position (a).

Figure 23:
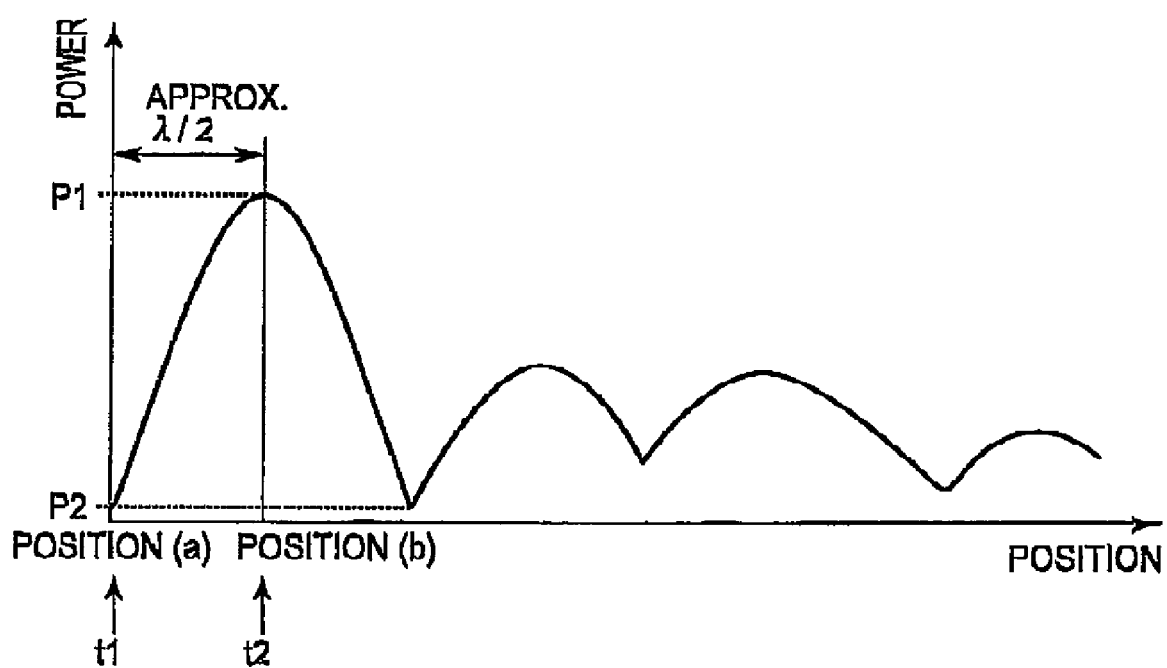
FIG. 23 is a chart showing fluctuation of received power duo to fluctuation in propagation path of an uplink signal from the radio communication terminal, in the radio base station according to the seventh embodiment of the present invention.

As shown in FIG. 23, with this, in the radio communication terminal 1201, the received power P2 at the position (a) at the time t2 is null, whereas received power of the downlink signal RSdown to be received at the position (b) to which the radio communication terminal moves at the time t2 is received at least not with the received power P2 of null, but with the received power P1 of the peak, for example.

Thus, the radio base station 1100 can suppress degradation of the communication quality even in the case where states of the propagation paths to the radio communication terminals 1201 to 1202 rapidly fluctuate because the communication target radio communication terminals 1201 to 1202 or objects existing around the communication target radio commination terminal 1201 to 1202 move at high speed (100 km/h or higher).

Moreover, in the radio base station 1100, in a case where the radio communication terminal 1201 and the radio communication terminal 1202 are expected to receive the downlink signals RSdown 1 to 2 with the received power P2 near the null at the time t2 of the respective receptions when a weight for the radio communication terminal 1201, for example, is calculated during ongoing radio communications with the multiple radio communication terminals 1201 to 1202 by using SDMA, the weight for the radio communication terminal 1201 is calculated so as to have the null at the position (a) at the time t1 and the peak at the position (c) where the radio communication terminal 1202 exists.

Thus, the radio communication terminal 1202 receive the downlink signal RSdown1 directed to the radio communication terminal 1201 with the received power P2 that is not the peak but, for example, near the null at the position (d) to which the radio communication terminal 1202 moves at the time t2. Accordingly, any in reference with the radio communication terminal 1202 due 2 to the downlink signal RSdown can be suppressed.

In addition, in the radio base station 1100, in a case where the radio communication terminal 1201 is expected to receive the downlink signal RSdown1 near the null at the time t2 and the radio communication terminal 1201 is expected no to move from the position (c) and receive the downlink signal RSdown2 at the peak when the weight for the radio communication terminal 1201 is calculated, the weight for the radio communication terminal 1201 is calculated so as to have the null at the position (a) at the time t1 and the null at the position (c) where the radio communication terminal 1202 exists.

Even in this case, since the radio communication terminal 1202 receives the downlink signal RSdown1 directed to the radio communication terminal 1201 at the position (c) at the time t2 with the received power P2 of the null, interference to the radio communication terminal 1202 due to the downlink signal RSdown1 can be suppressed.

Thus, in a case where communications using the space division multiple access scheme are performed between the radio base station 1100 and the multiple radio communication terminals 1201 to 1202, when the radio base station 1100 transmits the downlink signal RSdown1 to the radio communication terminal 1201, degradation of the communication quality of the radio communication terminal 1202 connected to the radio communication terminal 1201 through the space division multiple access can also be suppressed.

As described above, in the radio base station 1100, since a weight for one radio communication terminal 1201 is calculated so that a null is received at the other radio communication terminal 1202, interference with each other can be alleviated and degradation of the communication quality can be suppressed.

(Modification 1)

The present invention shall not be limited to the above embodiments and various change may be made thereto. In the radio base station 1100 according to the seventh embodiment, for example, a propagation path state detector 1103 may alternatively be configured to identify a cycle of Doppler variation of an uplink signal RSup1 as a first cycle of fluctuation $f_a$ and a cycle of Doppler variation of an uplink signal RSup2 as a second cycle of fluctuation $f_B$.

Here, the cycles of Doppler variation to be identified as the cycles of fluctuation described above represent frequencies of the uplink signals RSup that Doppler-changed depending on traveling speed of the radio communication terminals 1201 to 1202. In addition, the propagation path state detector 1103 notifies the weight calculator 1106 of the identified first cycle of fluctuation $f_A$ and second cycle of fluctuation $f_B$.

The weight calculator 1106 judges whether or not the radio communication terminals 1201 to 1202 move a distance which is almost half of a wavelength λ of frequencies f being used in radio signals for the radio communication terminals 1201 to 1202, during the processing time Δt described above.

Specifically, in the processing time Δt, the weight calculator 1106 in advance stores a lower limit value fL to an upper limit value fH of Doppler variation that corresponds to traveling speed when the radio communication terminals move the distance which is almost half of the wavelength λ of the frequencies f being so used in the radio signals, and thereby judges whether or not the first cycle of fluctuation $f_A$ identified by the propagation path state detector 1103 satisfies fL≦$f_A$<fH and whether or not the second cycle of fluctuation $f_B$ is fL≦$f_B$<fH. Note that other configurations are similar to the radio base station 1100 according to the seventh embodiment described above, and therefore description thereof will be omitted.

As described above, with the radio base station 1100 according to the modification 1, oven if Doppler variation corresponding to the traveling speed in moving a distance which is almost half of the wavelength λ is used for the first cycle of fluctuation $f_A$ to second cycle of fluctuation $f_B$, a weight can be calculated appropriately. Thus, for example, the radio communication terminal 1201 can not only suppress degradation of reception quality of the downlink signal. RSdown1, but also reduce interference of the downlink signal RSdown1 in the other radio communication terminal 1202.

(Modification 2)

The present invention shall not be limited to the present embodiments described above and various changes may be made thereto. As shown in FIG. 21, the radio base station 1100 according to the seventh embodiment may further include an antenna correlation detector 1121.

The antenna correlation detector 1121 is connected to receivers 1102_1 to 1102_n_ and an adaptive processing controller 1107.

The antenna correlation detector 1121 detects a degree of correlation of uplink signals RSup1 to 2 received by each of the plurality of element antennas 1101_1 to 1101_n_.

Specifically, the antenna correlation detector 1121 detects a degree of correlation of the plurality of element antennas 1101_1 to 1101_n_, on the basis of a phase and amplitude of the uplink signals RSup1 to 2 received by the receivers 1102_1 to 1102_n_.

Here, when the degree of correlation detected by the antenna correlation detector 1121 is high, in the radio communication terminal 1201, it is likely that a difference between received power value P1 of a peak and received power value P2 of a null of the first cycle of fluctuation $f_A$ due to fluctuation of the propagation path is small in a periodic signal (standing wave, for example) in the neighborhood. In addition, the antenna correlation detector 1121 notifies the weight calculator 1106 of the detected degree of correlation.

In addition, when the weight for downlink signal RSdown1 for the radio communication terminal 1201 is calculated only under conditions in which the notified degree of correlation is equal to or less than a predetermined correlation degree stored in advance and in which the weight calculator 1106 judges that processing time Δt is almost half of the cycle of fluctuation $f_A$, the weight calculator 1106 calculates the weight so that a null is directed to a position (a) of the radio communication terminal 1201 at the reception time of the uplink signal RSup1.

Meanwhile, based on the degree of correlation detected by the antenna correlation detector 1121, the adaptive processing controller 1107 transmits the downlink signal RSdown1 with a null or a beam directed to the position (a) of the radio communication terminal 1201 at the reception time t1 of the uplink signal RSup, depending on the weight calculated by the weight calculator 1106. Note that other configurations are similar to the radio base station 1100 according to the seventh embodiment described above, description thereof will be omitted.

As described above, with the radio base station 1100 according to the present embodiment, the weight calculator 1106 calculates a weight; so that the received power P2 will be null at the time t2, only when the degree of correlation detected by the antenna correlation detector 1121 is less than or equal to the predetermined degree of correlation, that is, only when the first cycle of fluctuation $f_A$ in the periodic signal (standing wave) around the radio communication terminal 1201 is long. Meanwhile, only in this case, the adaptive processing controller 1107 performs the adaptive array control by using the weight by which the received power P2 is the null at the position (a) at the time t2 and transmits the downlink signal RSdown. Accordingly, the radio base station 1100 performs the adaptive array suppress using the weight that will be null only when the first cycle of fluctuation $f_A$ is long, in consideration of the first cycle of fluctuation $f_A$ in the periodic signal around the radio communication terminals 1201 to 1202. Therefore, the downlink signal RSdown with the received power P1 of the peak can be efficiently transmitted to the radio communication terminal 1201.

Eighth Embodiment of the Present Invention

Configuration of Radio Base Station 1100 According to Eighth Embodiment

A configuration of a radio base station 1100 according to an eighth embodiment of the present invention will be described by focusing on differences from the seventh embodiment described above. In the following, parts different from the radio base station 1100 of the seventh embodiment will be mainly described and description of similar functions will be omitted as appropriate.

Figure 24:
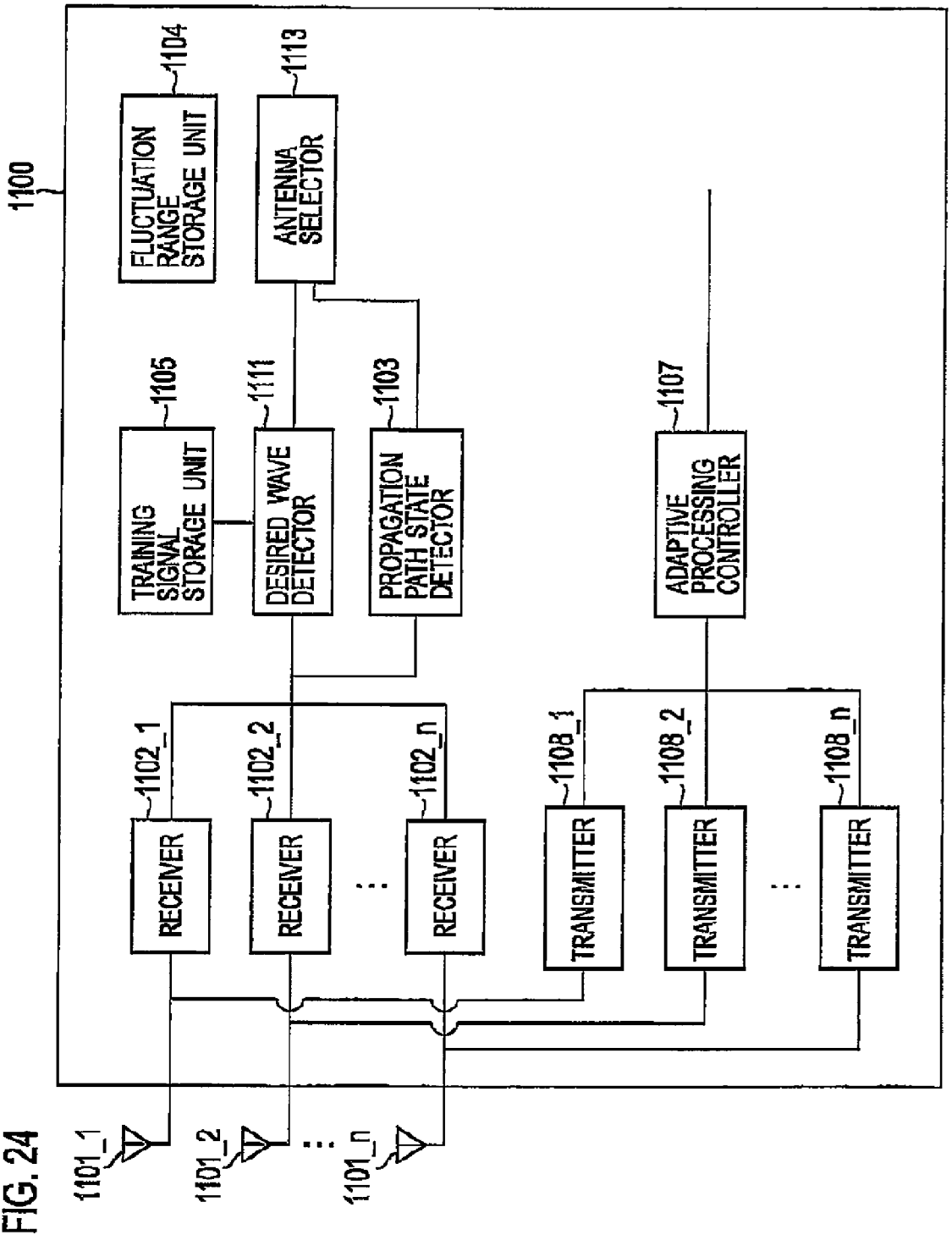
FIG. 24 is a functional block configuration diagram of a radio base station according to an eighth embodiment of the present invention.

As shown in FIG. 24, not being provided with the weight calculator 1106 included by the radio base station 1100 according to the seventh embodiment, the radio base station 1100 according to the present embodiment newly includes a desired wave power calculator 1111 and an antenna selector 1113.

The desired wave power calculator 1111 is connected to receivers 1102_1 to 1102_n_, a training signal storage unit 1105, and an antenna selector 1113.

The desired wave power calculator 1111 calculates desired wave received power on the basis of a training signal stored in the training signal storage unit 1105 and respective uplink signals RSup received by the receivers 1102_1 to 1102_n_. Moreover, the desired wave power calculator 1111 notifies the antenna selector 1113 of the calculated desired wave received power.

The antenna selector 1113 is connected to the desired wave calculator 1111, the propagation path state detector 1103, a fluctuation range storage unit 1104, dud an adaptive processing controller 1107.

The antenna selector 1113 selects at least any one of the element antennas 1101_1 to 1101_n, on the basis of a state of at least the uplink signal RSup1 or the uplink signal RSup2.

In addition, in a case where a first cycle of fluctuation $f_A$ (fluctuation state) of a propagation path to the radio communication terminal 1201 falls within a predetermined range when a downlink signal RSdown1 is transmitted to the radio communication device 1201, the antenna selector 1113 selects the element antennas 1101_1 to 1101_n with the uplink signal RSup1 of a small electric power value.

Then, similar to the seventh embodiment, the predetermined range described above moans the range from a lower limit value fL to an upper limit value fH of the range of the cycle of fluctuation stored in the fluctuation range storage unit 1104.

Meanwhile, in a case where the first cycle of fluctuation $f_A$ (fluctuation state) of the propagation path to the radio communication terminal 1201 is out of the predetermined range when the downlink signal RSdown1 is transmitted to the radio communication terminal 1201, the antenna selector 1113 selects the element antennas 1101_1 to 1101_n with the uplink signal RSup1 of a large electric power value.

In addition, in a case where a second cycle of fluctuation $f_B$ (fluctuation state) of a propagation path to the radio communication terminal 1202 is out of the predetermined range when the downlink signal RSdown1 is transmitted to the radio communication terminal 1201, the antenna selector 1113 selects the element antennas 1101_1 to 1101n with the uplink signal RSup2 of a small electric power value.

Meanwhile, in a case where the second cycle of fluctuation $f_B$ (fluctuation state) of the propagation path to the radio communication terminal 1202 falls within the predetermined range when the downlink signal RSdown1 is transmitted to the radio communication terminal 1201, the antenna selector 1113 selects the element antennas 1101_1 to 1101_n with the uplink signal RSup2 of a large electric power value.

Specifically, the antenna selector 1113 selects an antenna to be used for transmission, for example, so that $E[|e(t)|^2]$ of the following expressions (5) to (8) can be maximum, on the basis of: the desired wave received power from the radio communication terminal 1201 and the radio communication terminal 1202 that was calculated by the desired wave power calculator 1111 the first cycle of fluctuation $f_A$ and the second cycle of fluctuation fs from corresponding the radio communication terminal 1201 and the radio communication terminal 1202 that were identified by the propagation path state detector 1103; and the lower limit value fL and the upper limit value fH of the cycle of fluctuation stored in the fluctuation range storage unit 1104.

Note that, in the following expressions (5) to (8), $E[|e(t)|^2]$ represents expectation value computation, n represents an antenna, r(n) represents a desired wave power value at the antenna n (subscripts A and B represent values of the desired wave received power from the radio communication terminal 1201 and the radio communication terminal 1202). Incidentally, the case of selecting an antenna for the radio communication terminal 1201 is shown in the following example.

For example, when the first cycle of fluctuation $f_A$ to the second cycle of fluctuation $f_B$ satisfy fL≦fA<fH and fL≦$f_B$<fH, the antenna selector 1113 selects the antenna using the following expression (5):

[Expression 11]

$$E[|e(t)|^2]=E[-|r_A(n)|+|r_B(n)|]  \quad \text{Expression (5)}$$

Note that, with the above expression (5), an antenna with a small desired wave received power r and a large desired wave received power $r_B$ is selected at the time t1 when the uplink signal RSup1 to 2 are received. In addition, the antenna is selected with the following expression (6) when fL≦$f_A$<fH and fL>$f_B$≧fH.

[Expression 12]

$$E[|e(t)|^2]=E[-|r_A(n)|-|r_B(n)|]  \quad \text{Expression (6)}$$

Note that, with the above expression (6), a; antenna with small desired wave received power $r_A$ and small desired wave received power $r_B$ is selected at the time t1 when the uplink signals RSup1 to 2 are received. In addition, the antenna is selected with the following expression (7) when fL>$f_A$ or $f_A$≦fH, and F≈$f_B$>fH.

[Expression 13]

$$E[|e(t)|^2]=E[+|r_A(n)|+|r_B(n)|]  \quad \text{Expression (7)}$$

Note that, with the above expression (7), an antenna with large desired wave received power $r_A$ and large desired wave received power $r_B$ is selected at the time t1 when the uplink signals RSup1 to 2 are received. In addition, the antenna is selected with the following expression (8) when fL>$f_A$ or $f_A$≦fH, and fL>$f_B$ or $f_B$≧fH.

[Expression 14]

$$E[|e(t)|^2]=E[+|r_A(n)|-|r_B(n)|]  \quad \text{Expression (8)}$$

Note that, with the above expression (8), an antenna with large desired wave received power $r_A$ and small desired wave received power $r_A$ is selected at the time t1 when the uplink signals RSup1 to 2 are received. In this way, the antenna selector 1113 selects an antenna for the radio communication terminal 1201, depending on the first cycle of fluctuation $f_A$ to the second cycle of fluctuation $f_B$ identified by the propagation path detector 1103 and the size of the desired wave received power $r_A$ to $r_B$ calculated by the desired wave power calculator 1111. Note that, the antenna selector 1113 similarly works when selecting an antenna for the radio communication terminal 1202.

The adaptive processing controller 1107 transmits the downlink signals RSdown1 to 2 via the element antennas 1101_1 to 1101_n selected by the antenna selector 1113. Note that, in the radio base station 1100 according to the present embodiment, description of other configurations are similar to the seventh embodiment described above, and therefore description thereof will be omitted.

Operation of Radio Base Station According to Eighth Embodiment

Figure 25:
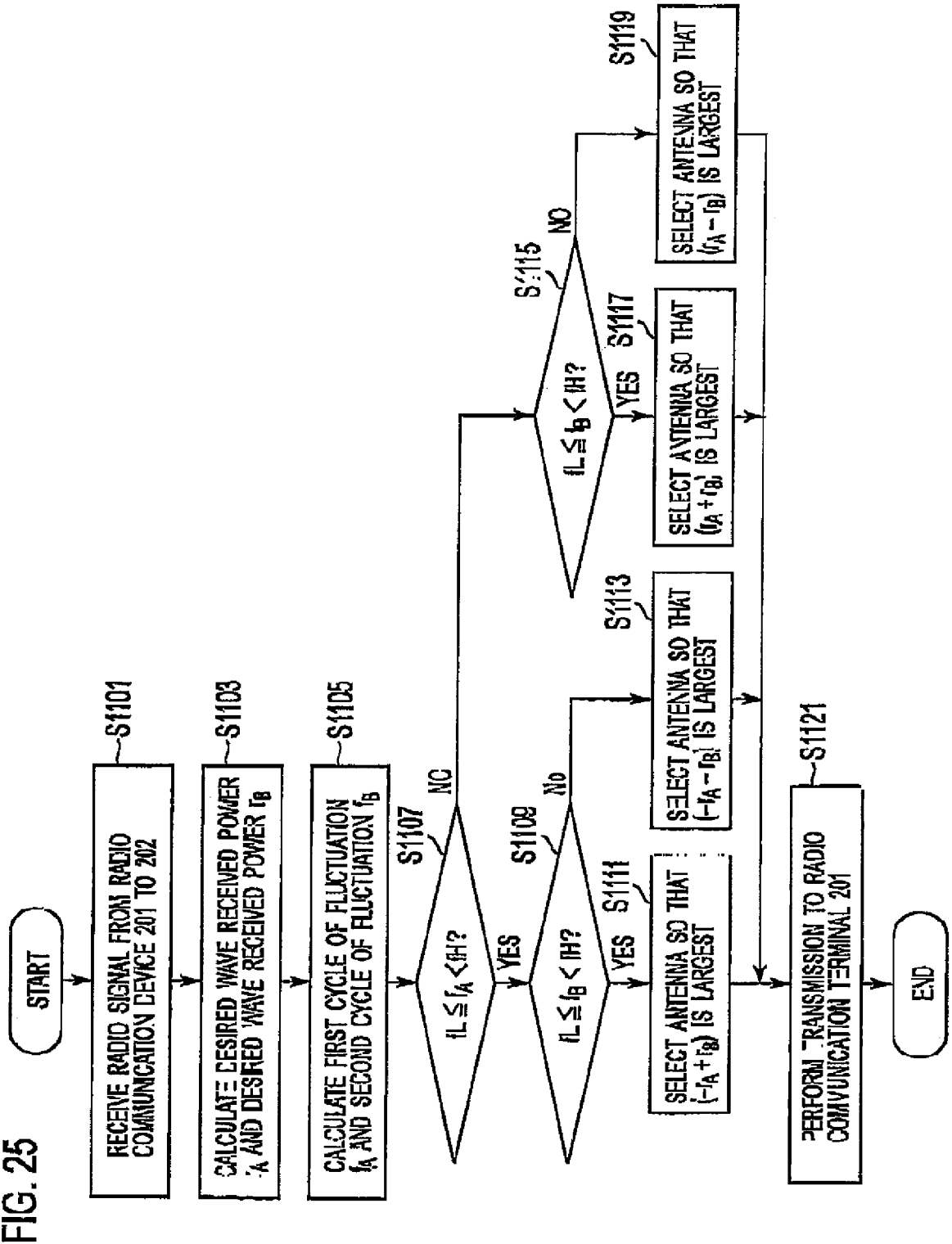
FIG. 25 is an operation flowchart in the radio base station according to the eighth embodiment of the present invention.

The operation of the radio base station 1100 according to the present embodiment will be described with reference to FIG. 25. Note that the operation as described below is the operation of selecting an antenna to be used in transmitting the downlink signal RSdown1 to the radio communication terminal 1201.

In step S1101 in the radio base station 1100, the receivers 1102_1 to 1102_n receive the uplink signals RSup1 to 2 from the radio communication terminals 1201 to 1202, respectively.

In stop S1103, the desired wave power calculator 1111 calculates the desired wave received power $r_A$ from the radio communication terminal 1201 and the desired wave received power $r_B$ from the radio communication terminal 1202.

In step S1105, the propagation path state detector 1103 calculates the first cycle of fluctuation $f_A$ of a desired wave from the radio communication terminal 1201 and the second cycle of fluctuation $f_B$ from the radio communication terminal 1201.

In step S1107, the antenna selector 1113 judges whether or not the first cycle of fluctuation $f_A$ satisfies the lower limit value fL≦$f_A$<the upper limit value fH.

In step 1109, (When fL≦$f_A$<fH), the antenna selector 1113 judges whether or not the second cycle of fluctuation $f_B$ satisfies the lower limit value fL≦$f_B$<upper limit value fH.

In step S1111, (when fL≦$f_A$<fH dad when fL≦$f_B$<fH), the antenna selector 1113 selects an antenna with small desired wave received power $r_A$ and large desired wave received power $r_B$ by using the above expression (5).

In step S1113, (when fL≦$f_A$<fH, and fL>$f_B$ or $f_B$≧fH), the antenna selector 1113 selects an antenna with small desired wave power $r_A$ and small desired wave received power $r_B$ by using the above expression (5).

In step S1115, (when not fL≦$f_A$<fH), the antenna selector judges whether or not the second cycle of fluctuation $f_H$ satisfies the lower limit value fL≦$f_B$<the upper limit value.

In step S1117, (when fL>$f_A$ or $f_A$≧fH, and fL≦$f_B$<fH), the antenna selector 1113 selects an antenna with large desired wave received power $r_A$ and largo desired wave received power $r_B$ by using the expression (7).

In step S1119, (when fL>$f_A$ or $f_A$≦fH, and fL>$f_a$ or $f_B$≧fH), the antenna selector 1113 selects an antenna with large desired wave received power $r_A$ and small desired wave received power $r_B$ by using the above expression (8).

In step S1121, the active processing controller 1107 transmits the downlink signal RSdown1 to the radio communication terminal 1201 via the element antennas 1101_1 to 1101_n selected by the antenna selector 1113. Note that the operation in steps S1101 to 31121 described above is also performed on the radio communication terminal 1202.

Operations and Effects of Radio Base Station According to Eighth Embodiment

If it is judged that the processing time Δt is almost half of the cycle of fluctuation $f_A$ of the uplink signals RSup1 to 2 transmitted from the radio communication terminals 1201 to 2, that is, if it is expected that fluctuation in the propagation paths causes reception of downlink signals RSdown1 to 2 with received power P2 of null when the radio communication terminals 1201 to 2 receive the downlink signals RSdown1 to 2, the radio base station 1100 according to the present embodiment as described above selects an antenna with small desired wave received power $r_A$ and then transmits the downlink signal RSdown1 to the radio communication terminal 1201, for example.

Figure 26:
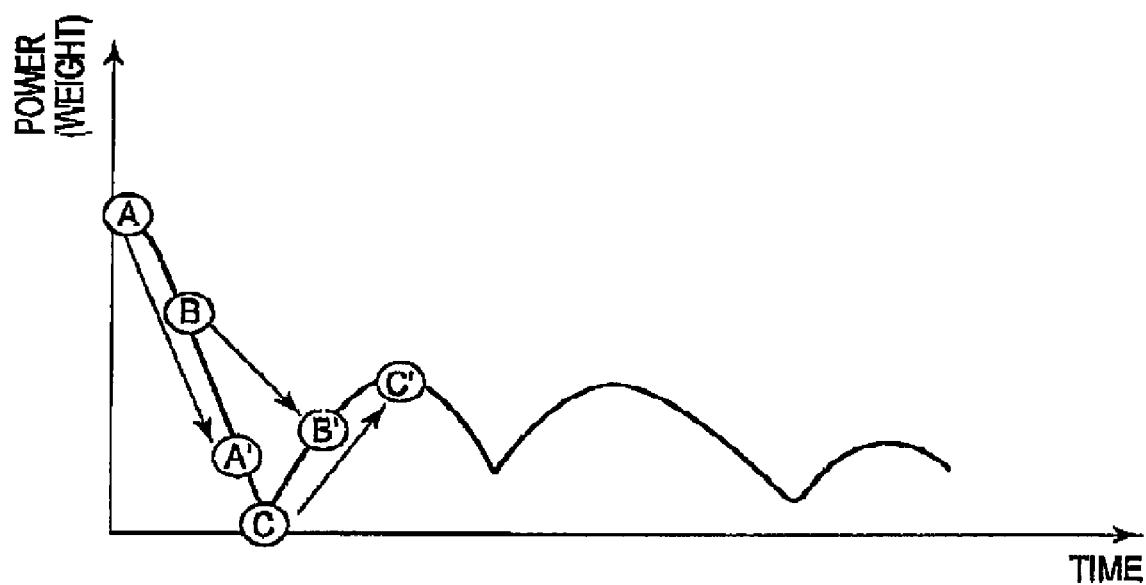
FIG. 26 is a chart showing fluctuation of received power due to fluctuation in a propagation path of an uplink signal from a radio communication terminal, in the radio base station according to the eighth embodiment of the present invention.

Here, as shown in FIG. 26, in the radio base station 1100, influenced by Doppler variation due to movement of the radio communication terminal 1201, desired wave power to be received by the receivers fluctuates. At this time, the larger desired wave power the element antenna has, the better the propagation path between the element antenna and the radio communication terminal 1201 is, which thereby enables efficient communications in both transmission and reception.

Meanwhile, if the propagation path fluctuates so that the radio communication terminal 1201 moves to a null (valley) of a periodic signal (standing wave) at the time t2 when the radio base station 1100 transmits the downlink signal RSdown, it is likely that magnitude of the desired wave power at the reception time t1 of the uplink signal RSup and an absolute value of the weight at the transmission time t2 of the downlink signal RSdown will be reversed (magnitude of A to C in FIG. 26 will be reversed to A' to C', for example). Accordingly, the radio base station 1100 transmits the downlink signal RSdown by using the element antenna with the small desired wave power selected by the antenna selector 1113, and thus the radio communication terminal 1201 can acquire good communication quality at a position (b) at the time t2 of receiving the downlink signal RSdown.

Moreover, assume a case where the radio communication terminal 1201 and the radio communication terminal 1202 are expected to receive the downlink signals RSdown 1 to 2 with the received power P2 near the null at the time t2 of the reception when the radio base station 1100 transmits the downlink signal RSdown1 addressed to, for example, the radio communication terminal 1201 during ongoing radio communication with the multiple radio terminal communication terminals 1201 to 1202 by using SDMA. In this case, for the radio communication terminal 1201, an antenna with small desired wave received power is selected so as to have a null at the position (a) at the time t1, while an antenna with large desired wave received power is selected to have a peak at the position (c) at the time t1 when the radio communication terminal 1202 exists.

Consequently, the radio communication terminal 1201 receives the downlink signal RSdown1 addressed to the radio communication terminal 1201 at the position (d) at the time t2, with the received power P2 of not peak but near null. Therefore, interference with the radio communication terminal 1202 due to the downlink signal RSdown1 can be suppressed.

In this way, since the radio base station 1100 selects an antenna appropriately and transmits the downlink signal RSdown1 addressed to one radio communication terminal 1201 so that the other radio communication terminal 1202 have a null, interference with each other can be alleviated and degradation of the communication quality can be suppressed.

Other Embodiments

As described above, content of the present invention has been disclosed through the seventh and eighth embodiments. However, it shall not be construed that the description and drawings constituting a part of this disclosure will limit the present invention. Various alternative embodiments will be apparent to those skilled in the art from this disclosure.

For example, in the present embodiments described above, the radio base station 1100 is configured to serve as a radio communication device. However, the radio communication terminal 1201, for example, may alternatively be configured to serve as a radio communication device. In addition, the radio base station 1100 may also be configured to serve as a counterpart radio communication device.

Furthermore, when the radio communication terminal 1201 is equipped with a position detection function such as a GPS, a traveling speed detection function, and the like, the radio base station 1100 may be configured to calculate a weight for directing a peak (beam) or a weight for directing a null depending on a position or a traveling speed detected by the radio communication terminal 1201.

It is also possible to combine each of configurations of the embodiments and configurations of the modifications. In addition, the operations and effects of each embodiment and each modification simply list the most preferable operations and effects of the present invention. Thus, the operations and effects of the present invention shall not be limited to description of the each embodiment and the each modification.

As described above, it is needless to say that the present invention contains various embodiments and the like that have not been described herein. Thus, a technical scope of the present invention shall be defined only by inventive specific matters according to the scope of claims that are reasonable from the above description.

Note that the content of Japanese Patent Application No. 2006-256541 (filed on Sep. 21, 2006) and Japanese Patent Application Nos. 2006-265805 (filed on Sep. 28, 2006) is incorporated herein by reference in their entirety.

INDUSTRIAL APPLICABILITY

As described above, the radio communication device and the radio communication method of to the present invention, are capable of suppressing degradation of the communication quality even in the case where the state of the propagation path to the radio so communication device rapidly fluctuates because a communication target radio communication device or an object existing around the communication target communication device moves at high speed, and therefore are useful in radio communications such as mobile communication.

The invention claimed is:

1. A radio communication device which adaptively controls directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication device comprising:
    a transmission controller configured to process the transmission radio signal according to a first control method for adaptively controlling the directivity of the transmission radio signal;
    a propagation path state detector configured to detect a fluctuation state of a propagation path to the counterpart radio communication device on the basis of the received radio signal; and
    a judgment unit configured to judge whether or not to change the directivity of the transmission radio signal on the basis of the fluctuation state of the propagation path detected by the propagation path state detector, wherein
    when the judgment unit judges to change the directivity of the transmission radio signal, the transmission controller switches to a second control method that is different from the first control method, and then processes the transmission radio signal according to the second control method.

2. The radio communication device according to claim 1, wherein
    the propagation path state detector identifies a cycle of so fluctuation in which the fluctuation state of the propagation path to the counterpart radio communication device fluctuates, on the basis of the detected fluctuation state of the propagation path, and the judgment unit judges whether or not to change the directivity of the transmission radio signal, on the basis of, the cycle of fluctuation.

3. The radio communication device according to claim 2, wherein
    when judging whether or not to change the directivity, the judgment unit makes a comparison between the cycle of fluctuation identified by the propagation path detector and processing time from a time of receiving the received radio signal from the counterpart radio communication device to a time of transmitting the transmission radio signal, and
    the transmission controller transmits the transmission radio signal with a null directed to a position where the counterpart radio communication device is located at the time of receiving the received radio signal, on the basis of a result of the comparison between the processing time and the cycle of fluctuation by the judgment unit.

4. The radio communication device according to claim 3, wherein
    when judging whether or not to change the directivity, the judgment unit judges whether or not the processing time is almost half of the cycle of fluctuation, and
    when the judgment unit judges that the processing time is almost half of the cycle of fluctuation, the transmission controller transmits the transmission radio signal with the null directed to position where the counterpart radio communication device is located at the time of receiving the received radio signal, according to the second control method.

5. The radio communication device according to claim 3, further comprising:
    a phase difference calculator configured to receive a known signal transmitted from the counterpart radio communication device and having known values of amplitude and phase, and to calculate a phase difference between the received known signal and a known signal that has been stored in advance in the radio communication device, wherein
    using the phase difference calculated by the phase difference calculator, the transmission controller assigns the transmission radio signal a transmission weight causing a null to be directed to a position where the counterpart radio communication device is located at the time of receiving the received radio signal, according to the second control method.

6. The radio communication device according to claim 5, wherein
    the phase difference calculator calculates a phase difference between the known signal stored in the radio communication device and each of the received radio signal respectively received by the plurality of element antennas, and
    in the second control method, on the basis of a plurality of the phase differences calculated by the phase difference calculator and an electric power value of the received radio signal respectively received by the plurality of element antennas, the transmission controller assigns the transmission radio signal the transmission weight with which an electric power value of the transmission radio signal to be transmitted via the plurality of element antennas become small at the position where the counterpart radio communication device is located at the time of receiving the received radio signal.

7. The radio communication device according to claim 3, further comprising:
a correction term calculator configured to calculate a correction term to be used in a computation formula for computing a transmission weight of the transmission radio signal, on the basis of the fluctuation state of the propagation path detected by the propagation path state detector, wherein
the transmission controller assigns the transmission weight to the transmission radio signal by use of the correction term calculated by the correction term calculator, according to the second control method.

8. The radio communication device according to claim 3, wherein
the received radio signal use a plurality of frequency bands,
the radio communication device further comprising a frequency band correlation detector configured to detect degrees of correlation between the plurality of frequency bands, wherein
the transmission controller transmits the transmission so radio signal in some of the frequency bands whose degree of correlation detected by the frequency band correlation detector is equal to or higher than a predetermined threshold, according to the second control method using a common weight causing a null to be directed to the position where the counterpart radio communication device is located at the time of receiving the received radio signal.

9. The radio communication device according to claim 2, wherein
the propagation path state detector detects the fluctuation state by detecting Doppler variation of each of the received radio signal.

10. The radio communication device according to claim 2, wherein the propagation path state detector detects the fluctuation state by detecting fluctuation in an electric power value of each of the received radio signal.

11. The radio communication device according to claim 2, further comprising:
an antenna correlation detector configured to detect degrees of correlation between the received radio signal respectively received by the plurality of element antennas, wherein
the transmission controller transmits the transmission radio signal with a null directed to a position where the counterpart radio communication device is located at the time of receiving the received radio signal, according to the second control method, on the basis of the degrees of correlation detected by the antenna correlation detector.

12. The radio communication device according to any one of claim 1 and 2, further comprising:
an antenna selector configured to select at least any one of the element antennas on the basis of the states of the received radio signal, wherein
the transmission controller transmits the transmission radio signal via the element antenna selected by the antenna selector.

13. The radio communication device according to claim 12, wherein the antenna selector selects any one of the element antennas having the lowest electric power value of the received radio signal.

14. A radio communication method used in a radio communication device configured to adaptively controls directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication method comprising:
a control step of processing the transmission radio signal according to any of a first control method for adaptively controlling directivity of the transmission radio signal;
a detection stop unit of detecting a fluctuation state of a propagation path to the counterpart radio communication device on the basis of the received radio signal; and
a judgment step of judging whether or not to change the directivity of the transmission radio signal on the basis of the detected fluctuation state of the propagation path, wherein
in the control step, the radio communication device switches to a second control method that is different from the first control method and then processes the transmission radio signal according to the second control method so that a null is directed to a position of the counterpart radio communication device at the reception time of the received radio signal, when it is judged that the directivity of the transmission radio signal is to be changed.

15. The radio communication method according to claim 14, wherein
in the control step, the radio communication device processes the transmission radio signal according to the first control method so that the beam is directed to the position of the counterpart radio communication device at the reception time of the received radio signal, when it is judged that the directivity of the transmission radio signal is to be changed in the judgment step.

16. A radio communication device which adaptively controls directivity of transmission radio signal by use of a plurality of element antennas, the radio communication device comprising:
a first propagation path state detector configured to detect a first fluctuation state that is a fluctuation state of a propagation path to a first counterpart radio communication device, on the basis of a first received radio signal received from the first counterpart radio communication device;
a second propagation path state detector configured to detect a second fluctuation state that is a fluctuation state of the propagation path to a second counterpart radio communication device, on the basis of a second received radio signal received from the second counterpart radio communication device;
a judgment unit configured to judge whether or not to change the directivity of the transmission radio signal to be transmitted to the first counterpart radio communication device, on the basis of the first fluctuation state; and
a transmission controller configured to change the so directivity of the transmission radio signal to be transmitted to the first counterpart radio communication device, on the basis of the first fluctuation state and the second fluctuation state when the judgment unit judges that the directivity of the transmission radio signal to be transmitted to the first counterpart radio communication device is to be changed.

17. The radio communication device according to claim 16, where in, when transmitting the transmission radio signal to the first counterpart radio communication device, the transmission controller transmit the transmission radio signal with a beam directed to the second counterpart radio communication device.

18. The radio communication device according to claim 16, wherein, when transmitting the transmission radio signal to the first counterpart radio communication device, the transmission controller transmits the transmission radio signal with a null directed to the second counterpart radio communication device.

19. The radio communication device according to claim 16, wherein
the first propagation path state detector detects a first cycle of fluctuation in which the state of the propagation path to the first counterpart radio communication device fluctuates, on the basis of the first received radio signal,
the second propagation path state detector detects a second cycle of fluctuation in which the state of the propagation path to the second counterpart radio communication device fluctuates, on the basis of the second received radio signal, and
the judgment unit judges whether or not to transmit the transmission radio signal with the null directed to the first so counterpart radio communication device, on the basis of the first cycle of fluctuation and the second cycle of fluctuation.

20. The radio communication device according to claim 19, wherein the judgment unit makes a comparison between the first cycle of fluctuation detected by the first propagation path state detector and processing time from the time of receiving the first received radio signal from the first counterpart radio communication device to the time of transmitting the transmission radio signal, and also makes a comparison between the second cycle of fluctuation detected by the second propagation path state detector and processing time from the time of receiving the second received radio signal from the second counterpart radio communication device to the time of transmitting the transmission radio signal, and
the transmission controller transmits the transmission radio signal with the null directed to the position where the first counterpart radio communication device is located at the time of receiving the first received radio signal, on the basis of the comparison result between the processing time and the first cycle of fluctuation by the judgment unit, and the comparison result between the processing time and the second cycle of fluctuation by the judgment unit.

21. The radio communication device according to claim 20, wherein, when the judgment unit judges that the processing time falls within a predetermined range corresponding to the first cycle of fluctuation and that the processing time falls within a predetermined range corresponding to the second cycle of fluctuation, the transmission controller transmits the transmission radio signal with the null directed to the position where the first counterpart radio communication device is located at the time of receiving the first received radio signal.

22. The radio communication device according to claim 21, wherein the transmission controller transmits the transmission radio signal with the null directed to the position where the first counterpart radio communication device is located at the time of receiving the first received radio signal and with the beam directed to the second counterpart radio communication device.

23. The radio communication device according to claim 20, wherein, when the judgment unit judges that the processing time falls within the predetermined rang corresponding to the first cycle of fluctuation and that the processing time is out of the predetermined range corresponding to the second cycle of fluctuation, the transmission controller transmits the transmission radio signal with the null directed to the position where the first counterpart radio communication device is located at the time of receiving the first received radio signal and with the null directed to the second counterpart radio communication device.

24. The radio communication device according to claim 19, wherein
the first propagation path state detector detects a cycle of Doppler variation of each of the first received radio signal as the first cycle of fluctuation, and
the second propagation path state detector detects a cycle of Doppler variation of each of the second received radio signal as the second cycle of fluctuation.

25. The radio communication device according to claim 19, wherein
the first propagation path state detector detects a cycle of fluctuation of an electric power value or each of the first received radio signal as the first cycle of fluctuation, and
the second propagation path state detector detects a cycle of fluctuation of an electric power value of each of the second received radio signal as the second cycle of fluctuation.

26. The radio communication device according to claim 16, further comprising:
an antenna correlation detector configured to detect degrees of correlation between the first received radio signal respectively received by the plurality of element antennas, wherein
the transmission controller transmits the transmission radio signal with the null directed to the position where the first counterpart radio communication device is located at the time of receiving the first received radio signal, on the basis of the degrees of correlation detected by the antenna correlation detector.

27. The radio communication device according to claim 16, further comprising:
an antenna selector configured to select at least any one of the element antennas on the basis of at least the state of the first received radio signal or the second received radio signal, wherein
the transmission controller transmits the transmission radio signal via the element antenna selected by the antenna selector.

28. The radio communication device according to claim 27, wherein the antenna selector selects an element antenna having a small electric power value of the first received radio signal, if the first fluctuation state falls within a predetermined range.

29. The radio communication device according to claim 27, wherein the antenna selector selects an element antenna having a large electric power value of the first received radio signal, if the first fluctuation state is out of the predetermined range.

30. The radio communication device according to any one of claim 28 and 29, wherein the antenna selector selects an element antenna having a small electric power value of the second received radio signal, if the second fluctuation state is out of the predetermined range.

31. The radio communication device according to any one of claim 28 and 29, wherein the antenna selector selects an element antenna having a large electric power value of the second received radio signal, if the second fluctuation state is out of the predetermined range.

32. A radio communication method used in a radio communication device configured to adaptively control directivity of transmission radio signal by use of a plurality of element antennas, the radio communication method comprising:
a first detection step of detecting a first fluctuation state that is a fluctuation state of a propagation path to a first counterpart radio communication device, on the basis of a first received radio signal received from the first counterpart radio communication device;

a second detection step of detecting a second fluctuation state that is a fluctuation state of a propagation path to a second counterpart radio communication device, on the basis of a second received radio signal received from the second counterpart radio communication device;

a judgment step of judging whether or not to change the directivity of the transmission radio signal to be transmitted to the first counterpart radio communication device, on the basis of the first fluctuation state; and a control step of changing the directivity of the transmission radio signal to be transmitted to the first counterpart radio communication device, on the basis of the first fluctuation state and the second fluctuation state, when it is judged that the directivity of the transmission radio signal to be transmitted to the first counterpart radio communication device is to be changed in the judgment step.

* * * * *